United States Patent
Lv et al.

(10) Patent No.: US 11,962,909 B2
(45) Date of Patent: Apr. 16, 2024

(54) CAMERA, METHOD, APPARATUS AND DEVICE FOR SWITCHING BETWEEN DAYTIME AND NIGHTTIME MODES, AND MEDIUM

(71) Applicant: ZHEJIANG UNIVIEW TECHNOLOGIES CO., LTD., Zhejiang (CN)

(72) Inventors: Qiankun Lv, Zhejiang (CN); Zhengjie Shi, Zhejiang (CN)

(73) Assignee: ZHEJIANG UNIVIEW TECHNOLOGIES CO., LTD., Zhejiang (CN)

( * ) Notice: Subject to any disclaimer, the term of this patent is extended or adjusted under 35 U.S.C. 154(b) by 299 days.

(21) Appl. No.: 17/441,192

(22) PCT Filed: Oct. 23, 2019

(86) PCT No.: PCT/CN2019/112701
§ 371 (c)(1),
(2) Date: Sep. 20, 2021

(87) PCT Pub. No.: WO2020/186751
PCT Pub. Date: Sep. 24, 2020

(65) Prior Publication Data
US 2022/0182525 A1 Jun. 9, 2022

(30) Foreign Application Priority Data
Mar. 20, 2019 (CN) .......................... 201910212865.7

(51) Int. Cl.
*H04N 23/71* (2023.01)
*G06T 7/90* (2017.01)
(Continued)

(52) U.S. Cl.
CPC ............... *H04N 23/71* (2023.01); *G06T 7/90* (2017.01); *H04N 9/77* (2013.01); *H04N 23/72* (2023.01);
(Continued)

(58) Field of Classification Search
CPC .......... H04N 23/71; H04N 9/77; H04N 23/72; H04N 23/88; H04N 23/667; H04N 23/74;
(Continued)

(56) References Cited

U.S. PATENT DOCUMENTS 9,386,230 B1 * 7/2016 Duran ....................... H04N 5/33
10,586,351 B1 * 3/2020 Brailovskiy .......... H04N 23/667
(Continued)

FOREIGN PATENT DOCUMENTS

CN 103716527 A 4/2014
CN 104301616 A 1/2015
(Continued)

OTHER PUBLICATIONS

Chinese Office Action for Application No. 201910212865.7, dated Jan. 20, 2021, 15 pages including machine translation.
(Continued)

*Primary Examiner* — Fernando Alcon
(74) *Attorney, Agent, or Firm* — Morgan, Lewis & Bockius LLP

(57) ABSTRACT

Provided are a camera, a method, apparatus and device for switching between a day mode and a night mode, and a medium. The method includes steps described below. In response to a current camera mode being the night mode, a color temperature value of a current imaging picture is determined. Visible light illuminance of the current imaging picture is determined by utilizing the color temperature value and an infrared light contribution ratio of picture brightness obtained based on white balance statistical infor- (Continued)

mation of the current imaging picture and used as first visible light illuminance. It is determined whether to switch from the current night mode to the day mode by utilizing a magnitude relationship between the first visible light illuminance and a first preset illuminance threshold. According to the present application, the accuracy of determining the visible light illuminance in the night mode is improved, and thus the problem of repeated switching between the day mode and the night mode is effectively improved.

20 Claims, 10 Drawing Sheets

(51) Int. Cl.
  *H04N 9/77* (2006.01)
  *H04N 23/72* (2023.01)
  *H04N 23/88* (2023.01)
(52) U.S. Cl.
  CPC ... *H04N 23/88* (2023.01); *G06T 2207/10024* (2013.01); *G06T 2207/10048* (2013.01)
(58) Field of Classification Search
  CPC .......... H04N 5/33; H04N 17/002; G06T 7/90; G06T 2207/10024; G06T 2207/10048
  See application file for complete search history.

(56) References Cited

U.S. PATENT DOCUMENTS

| | | | | |
|---|---|---|---|---|
| 2014/0078325 | A1* | 3/2014 | Sakaida | H04N 23/667 |
| | | | | 348/208.4 |
| 2016/0366337 | A1 | 12/2016 | Duran et al. | |
| 2018/0120661 | A1* | 5/2018 | Kilgore | H04N 23/11 |
| 2018/0188004 | A1* | 7/2018 | Zhang | H04N 5/33 |
| 2018/0288382 | A1 | 10/2018 | Kring | |
| 2019/0246025 | A1* | 8/2019 | Duran | H04N 23/73 |
| 2019/0364187 | A1* | 11/2019 | Kawasaki | H04N 23/71 |
| 2020/0177781 | A1* | 6/2020 | Numata | H04N 23/55 |

FOREIGN PATENT DOCUMENTS

| | | | |
|---|---|---|---|
| CN | 104580896 | A | 4/2015 |
| CN | 105187731 | A | 12/2015 |
| CN | 105491283 | A | 4/2016 |
| CN | 106101549 | A | 11/2016 |
| CN | 106454099 | A | 2/2017 |
| CN | 107948521 | A | 4/2018 |
| CN | 108093183 | A | 5/2018 |
| CN | 104580896 | B | 6/2018 |
| CN | 109151390 | A | 1/2019 |
| JP | 2002135788 | A | 5/2002 |

OTHER PUBLICATIONS

First Search of Chinese Patent Application No. 201910212865.7, date unknown, 2 pages.
International Search Report for Application No. PCT/CN2019/112701, dated Feb. 12, 2020, 4 pages include English translation.
Second Supplementary Search of Chinese Patent Application No. 201910212865.7, date unknown, 2 pages.
Supplementary Search of Chinese Patent Application No. 201910212865.7, date unknown, 1 page.
Lionardi et al., "Night to Day Algorithm for Video Camera", 2017 International Conference on Soft Computing, Intelligent System and Information Technology (ICSIIT), IEEE, Sep. 26, 2017, pp. 62-65.
Extended European Search Report of Application No. 19920145.0, dated Nov. 28, 2022, 10 pages.

* cited by examiner

CAMERA, METHOD, APPARATUS AND DEVICE FOR SWITCHING BETWEEN DAYTIME AND NIGHTTIME MODES, AND MEDIUM

CROSS-REFERENCE TO RELATED APPLICATIONS

This is a National Stage Application, filed under 35 U.S.C. 371, of International Patent Application No. PCT/CN2019/112701, filed on Oct. 23, 2019, which claims priority to Chinese Patent Application No. 201910212865.7 filed with the China National Intellectual Property Administration (CNIPA) on Mar. 20, 2019, the disclosures of which areis incorporated herein by reference in their entireties.

The present disclosure claims priority to Chinese Patent Application No. 201910212865.7 filed with the China National Intellectual Property Administration (CNIPA) on Mar. 20, 2019, the disclosure of which is incorporated herein by reference in its entirety.

TECHNICAL FIELD

The present application relates to the technical field of cameras, for example, a camera, a method, apparatus and device for switching between a day mode and a night mode and a medium.

BACKGROUND

At present, as the security market continues to grow, more and more cameras are used to monitor the surrounding environments of various places. For early cameras working in daytime, collected imaging pictures are generally able to satisfy actual requirements of users; however, once the night comes, obtained imaging images have relatively poor quality and thus the actual requirements of the users are hardly satisfied. For this reason, in the related art, two working modes are generally integrated in a camera, one is the day mode and the other is the night mode. When the night mode is turned on, the camera will project infrared light to the surrounding environment and allow the infrared light to enter the image sensor through the lens, so that the intensity of light entering the image sensor at night is increased. In addition, due to the strong ability of infrared light to resist light pollution, the quality of imaging pictures at night is greatly improved. When the day mode is turned on, the camera images under visible light while filtering infrared light in the surrounding environment to obtain daytime imaging pictures with a relatively high color accuracy.

For the camera having the day mode and the night mode, the imaging results in the day mode and the night mode are different. Whether accurate switching between the day mode and the night mode can be performed directly affects the quality of imaging pictures. In the related art, to achieve the process of switching between the day mode and the night mode, visible light illuminance of an imaging picture is generally determined first, and then whether the switching between the day mode and the night mode is required is further confirmed according to the magnitude of the visible light illuminance.

However, in the related art, when the visible light illuminance in the night mode is determined, only the impact of an infrared light contribution ratio obtained based on white balance statistical information on the visible light illuminance is generally considered, so that the obtained visible light illuminance has a relatively poor accuracy and a relatively large deviation from actual visible light illuminance. Since whether the switching between the day mode and the night mode is required is generally confirmed according to the magnitude of the visible light illuminance, the relatively poor accuracy of the visible light illuminance is prone to cause repeated switching between the day mode and the night mode, and as a result, the camera shooting experience of users is seriously affected.

SUMMARY

The present application provides a camera, a method, apparatus and device for switching between a day mode and a night mode of the camera and a medium. In this way, visible light illuminance with a relatively high accuracy can be acquired in the night mode, whether the switching between the day mode and the night mode is required can be more accurately determined, and thus the repeated switching between the day mode and the night mode is effectively improved. The scheme is described below.

The present application provides a method for switching between a day mode and a night mode. The method includes steps described below.

In response to the current camera mode being the night mode, a color temperature value of a current imaging picture is determined.

Visible light illuminance of the current imaging picture is determined by utilizing the color temperature value and an infrared light contribution ratio of picture brightness obtained based on white balance statistical information of the current imaging picture and used as first visible light illuminance.

It is determined whether to switch from the current night mode to the day mode by utilizing a magnitude relationship between the first visible light illuminance and a first preset illuminance threshold.

The present application further provides an apparatus for switching between a day mode and a night mode. The apparatus includes a color temperature value determination module, a first visible light illuminance determination module and a first switching control module.

The color temperature value determination module is configured to, in response to a current camera mode being the night mode, determine a color temperature value of a current imaging picture.

The first visible light illuminance determination module is configured to determine visible light illuminance of the current imaging picture by utilizing the color temperature value and an infrared light contribution ratio of picture brightness obtained based on white balance statistical information of the current imaging picture and use the visible light illuminance of the current imaging picture as first visible light illuminance.

The first switching control module is configured to determine whether to switch from the current night mode to the day mode by utilizing a magnitude relationship between the first visible light illuminance and a first preset illuminance threshold.

The present application further provides a device for switching between a day mode and a night mode. The device includes a memory and a processor.

The memory is configured to store a computer program.

The processor is configured to execute the computer program to implement the preceding method for switching between a day mode and a night mode.

The present application further provides a camera. The camera includes the preceding device for switching between a day mode and a night mode, an image sensor, an infrared lamp and an infrared cut-off filter.

The image sensor is configured to collect images.

The infrared lamp is configured to project infrared light to the surrounding environment.

The infrared cut-off filter is configured to filter infrared light to prevent the infrared light from entering the image sensor in a turned-on state, and allow the infrared light to pass through and enter the image sensor in a turned-off state.

The present application further provides a computer-readable storage medium configured to store a computer program, when the computer program is executed by a processor, implements the preceding method for switching between a day mode and a night mode.

In the present application, during the process of determining the infrared light contribution ratio of the picture brightness, not only the impact of the white balance statistical information of the current imaging picture is considered, but also the impact of the color temperature value in the night mode is considered. Therefore, the accuracy of the finally acquired visible light illuminance in the night mode is improved, the deviation between the finally acquired visible light illuminance and the actual visible light illuminance is reduced, and whether the switching between the day mode and the night mode is required can be more accurately determined so that the repeated switching between the day mode and the night mode is effectively improved.

BRIEF DESCRIPTION OF DRAWINGS

The drawings used in description of embodiments or the related art will be briefly introduced below. Apparently, the drawings described below illustrate only the embodiments of the present application, and those of ordinary skill in the art may obtain other drawings based on the provided drawings on the premise that no creative work is done.

DETAILED DESCRIPTION

The technical schemes in the embodiments of the present application will be described clearly and completely in conjunction with the drawings in the embodiments of the present application. Apparently, the embodiments described below are part, not all, of the embodiments of the present application. Based on the embodiments of the present application, all other embodiments obtained by those of ordinary skill in the art without creative work are within the scope of the present application.

At present, to acquire high-quality night imaging pictures, in the related art, a camera generally integrates a day mode and a night mode. For this kind of camera, the imaging result in the day mode is different from the imaging result in the night mode. The accuracy of determining whether the switching between the day mode and the night mode is required affects the quality of imaging pictures. In the related art, to achieve the process of switching between the day mode and the night mode, visible light illuminance of an imaging picture is generally determined first, and then it is further confirmed whether the switching between the day mode and the night mode is required according to the magnitude of the visible light illuminance. However, in the related art, when the visible light illuminance in the night mode is determined, only the impact of an infrared light contribution ratio obtained based on white balance statistical information on the visible light illuminance is generally considered, so that the obtained visible light illuminance has a relatively poor accuracy and a relatively large deviation from actual visible light illuminance. Since whether the switching between the day mode and the night mode is required is generally confirmed according to the magnitude of the visible light illuminance, the relatively poor accuracy of the visible light illuminance is prone to cause repeated switching between the day mode and the night mode, and as a result, the camera shooting experience of users is seriously affected. Therefore, the present application provides a scheme for switching between the day mode and the night mode, through which the visible light illuminance in the night mode with a relatively high accuracy can be acquired, whether the switching between the day mode and the night mode is required can be more accurately determined, and thus effectively improving the repeated switching between the day mode and the night mode.

Figure 1:
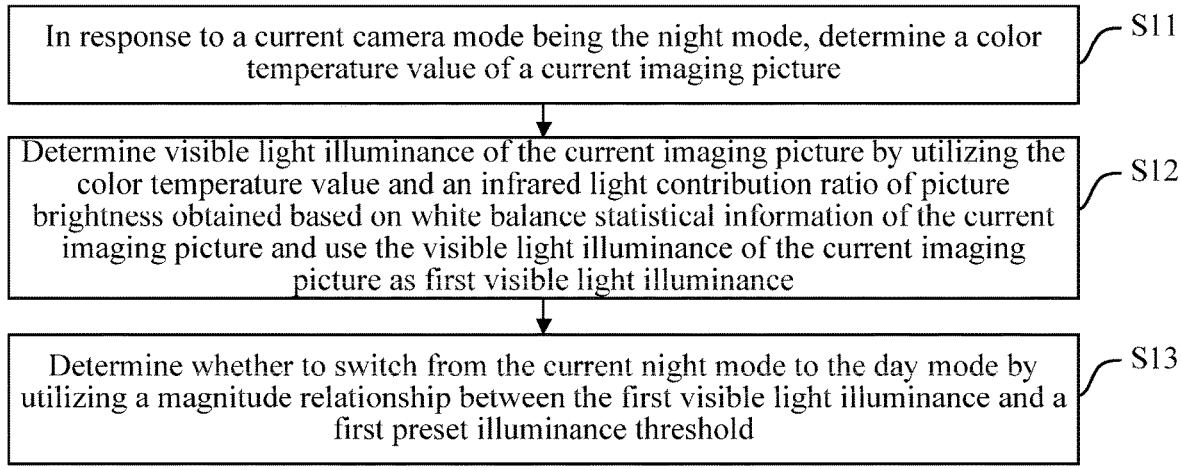
FIG. 1 is a flowchart of a method for switching between a day mode and a night mode according to the present application.

Referring to FIG. 1, an embodiment of the present application provides a method for switching between a day mode and a night mode. The method includes steps described below.

In step S11, in response to a current camera mode being the night mode, a color temperature value of a current imaging picture is determined.

It should be noted that the camera mode of the camera in the embodiment includes at least the day mode and the night mode. Imaging pictures in the day mode are pictures obtained by imaging under visible light, and pictures collected in this mode are generally color pictures, so the day mode is also referred to as a color camera mode. Imaging pictures in the night mode are pictures obtained by imaging under visible light and infrared light, and pictures collected in this mode are monochrome pictures, so the night mode is also referred to as a monochrome camera mode. The camera in the embodiment may be installed with an infrared lamp and an infrared cut-off filter (infrared-cut, IR-cut). In the day mode, the infrared cut-off filter may be turned on to filter infrared light in surrounding ambient light to improve the color accuracy of pictures and obtain high-quality color pictures. In the night mode, the infrared lamp is turned on and the infrared cut-off filter is turned off, so as to allow infrared light to enter the image sensor through the lens. In this way, the strength of light entering the image sensor at night is increased, and the imaging quality at night is improved due to the strong ability of infrared light to resist light pollution.

In the embodiment, if the current camera mode of the camera is the night mode, the color temperature value of an imaging picture in the current night mode is determined. It is to be understood that the above color temperature value of the imaging picture in the night mode refers to a color temperature value generated under the combined action of visible light and infrared light, that is, the color temperature value of the image picture generated after imaging under visible light and infrared light in the image sensor of the camera.

In step S12, visible light illuminance of the current imaging picture is determined by utilizing the color temperature value and an infrared light contribution ratio of picture brightness obtained based on white balance statistical information of the current imaging picture and used as first visible light illuminance.

In the embodiment, the white balance statistical information (that is, the automatic white balance (AWB)) of the current imaging picture refers to an average of three primary color components R, G, and B in the current imaging picture.

It should be noted that in the embodiment, the process of obtaining the infrared light contribution ratio of the picture brightness based on the white balance statistical information of the current imaging picture may include steps described below. An average of G/R values and an average of G/B values are determined by utilizing the white balance statistical information of the current imaging picture; and the above two average values are substituted into a preset formula for calculating the infrared light contribution ratio to obtain the infrared light contribution ratio of the picture brightness. The above preset formula for calculating the infrared light contribution ratio may satisfy that:

$$C_{IR} = \frac{(\overline{G/R} - \overline{G/B}) - P*(G/R_{VIS} - G/B_{VIS})}{P*(G/R_{IR} - G/B_{IR}) - P*(G/R_{VIS} - G/B_{VIS})};$$

where $C_{IR}$ represents the infrared light contribution ratio, $\overline{G/R}$ represents the average value of G/R values obtained based on the white balance statistical information of the current imaging picture, $\overline{G/B}$ represents the average value of G/B values obtained based on the white balance statistical information of the current imaging picture, $G/R_{VIS}$ represents a pre-acquired G/R value under full visible light, $G/B_{VIS}$ represents a pre-acquired G/B value under the full visible light, $G/R_{IR}$ represents a pre-acquired G/R value under full infrared light, $G/B_{IR}$ represents a pre-acquired G/B value under the full infrared light, and P represents a pre-acquired picture brightness conversion rate of the conversion between visible light and infrared light.

It should be further noted that infrared light projected by the infrared lamp in the night mode changes the color temperature value of the imaging picture, and RGB components in the imaging picture change as the color temperature value changes, so that the visible light illuminance calculated irrespective of the impact of the color temperature value deviates from the actual visible light illuminance. That is, if the visible light illuminance in the night mode is determined only according to the infrared light contribution ratio obtained based on the white balance statistical information, the obtained visible light illuminance includes not only the illuminance generated under the impact of the visible light, but also the illuminance generated under the impact of the infrared light, so that the above calculated visible light illuminance deviates from the actual visible light illuminance. Based on the above considerations, in the process of determining the visible light illuminance in the night mode in the embodiment, the visible light illuminance is determined by utilizing the color temperature value and the infrared light contribution ratio obtained based on the white balance statistical information. That is, in this embodiment, when the visible light illuminance in the night mode is determined, not only the impact of the infrared light contribution ratio obtained based on the white balance statistical information on the visible light illuminance is considered, but also the impact of the color temperature value of the imaging picture in the current night mode on the visible light illuminance is further considered. Therefore, the deviation between the calculated visible light illuminance and the actual visible light illuminance is reduced, and the accuracy of the finally acquired visible light illuminance in the night mode is improved.

In step S13, it is determined whether to switch from the current night mode to the day mode by utilizing a magnitude relationship between the first visible light illuminance and a first preset illuminance threshold.

It is to be understood that the first preset illuminance threshold is a preset illuminance threshold used when it is determined whether it is required to switch from the night mode to the day mode. If the first visible light illuminance is greater than the first preset illuminance threshold, it is determined that it is required to switch from the current night mode to the day mode; and if the first visible light illuminance is less than or equal to the first preset illuminance threshold, it is determined that mode switching is not required, and the current night mode is kept unchanged. In the embodiment, the first preset illuminance threshold may be set according to actual requirements.

It can be seen that in the embodiment of the present application, the visible light illuminance in the night mode is determined by utilizing the color temperature value and the infrared light contribution ratio obtained based on the white balance statistical information. That is, in the embodiment of the present application, during the process of determining the visible light illuminance in the night mode, not only the impact of the infrared light contribution ratio obtained based on the white balance statistical information on the visible light illuminance is considered, but also the impact of the color temperature value of the imaging picture in the current night mode on the visible light illuminance is further considered. In the embodiment of the present application, the reason why the impact of the color temperature value in the night mode on the visible light illuminance is considered is that infrared light projected in the night mode changes the color temperature value of the imaging picture, and RGB components in the imaging picture change as the color temperature value changes, so that the visible light illuminance calculated irrespective of the impact of the color temperature value deviates from the actual visible light illuminance. Therefore, if the visible light illuminance in the night mode is determined only according to the infrared light contribution ratio obtained based on the white balance statistical information, the obtained visible light illuminance includes not only the illuminance generated under the impact of the visible light, but also the illuminance generated under the impact of the infrared light, so that the above calculated visible light illuminance deviates from the actual visible light illuminance. In the embodiment of the present application, during the process of determining the infrared light contribution ratio of the picture brightness, not only the impact of the white balance statistical information of the current imaging picture is considered, but also the impact of the color temperature value in the night mode is considered. Therefore, the accuracy of the finally acquired visible light illuminance in the night mode is improved, the deviation from the actual visible light illuminance is reduced, and whether the switching between the day mode and the night mode is required can be more accurately determined so that the repeated switching between the day mode and the night mode is effectively improved.

Figure 2:
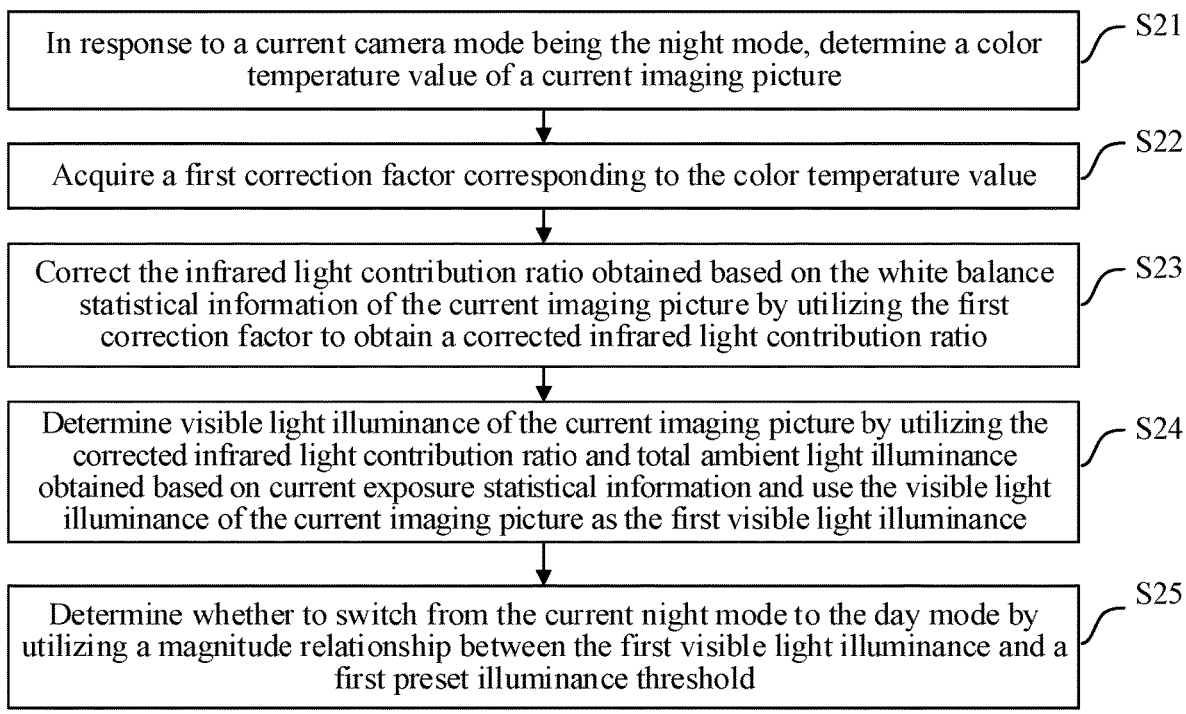
FIG. 2 is a flowchart of a method for switching between a day mode and a night mode according to the present application.

Referring to FIG. 2, an embodiment of the present application provides a method for switching between a day mode and a night mode. The method includes steps described below.

In step S21, in response to a current camera mode being the night mode, a color temperature value of a current imaging picture is determined.

In step S22, a first correction factor corresponding to the color temperature value is acquired.

It should be noted that the first correction factor of the embodiment is a factor used for correcting the infrared light contribution ratio obtained based on white balance statistical information. In the use of the camera, since RGB components in the imaging picture change as the color temperature value changes, a deviation exists between the infrared light contribution ratio obtained based on the white balance statistical information and the actual infrared light contribution ratio. To obtain first visible light illuminance in the night mode with a relatively high accuracy subsequently, in the embodiment, the infrared light contribution ratio obtained based on the white balance statistical information may be corrected first according to the color temperature value of the current imaging picture, and then the first visible light illuminance is determined by utilizing the corrected infrared light contribution ratio.

In step S23, the infrared light contribution ratio obtained based on the white balance statistical information of the current imaging picture is corrected by utilizing the first correction factor to obtain a corrected infrared light contribution ratio.

In step S24, visible light illuminance of the current imaging picture is determined as the first visible light illuminance by utilizing the corrected infrared light contribution ratio and total ambient light illuminance obtained based on current exposure statistical information.

It is to be understood that the current exposure statistical information (that is, the auto exposure (AE)) in the embodiment may include information such as the exposure time, the gain and the aperture. In the embodiment, light illuminance of the image sensor may be calculated by utilizing the above exposure statistical information and combining with a conventional method to obtain the total ambient light illuminance.

In the embodiment, a formula for calculating the first visible light illuminance may be that:

$$Lux_{vis}=Lux_{total}*(1-C_{ir}*\alpha_{ir})=Lux_{total}*(1-C_{ir\text{-}Modified});$$

where $Lux_{vis}$ represents the first visible light illuminance, $Lux_{total}$ represents the total ambient light illuminance, $C_{ir}$ represents the infrared light contribution ratio, $\alpha_{ir}$ represents the first correction factor, and $C_{ir\text{-}Modified}$ represents the corrected infrared light contribution ratio.

It should be noted that in the embodiment, before step S22, different first correction factors $\alpha_{ir}$ corresponding to different color temperature values may be determined first. In the embodiment, different first correction factors $\alpha_{ir}$ corresponding to different color temperature values may be acquired based on a formula for determining the first factor and in combination with repeated experiments. The formula for determining the first factor may be that:

$$\alpha_{ir} = \frac{Lux_{total} - Lux_{vis}}{Lux_{total} * C_{ir}}.$$

It is to be understood that when different first correction factors $\alpha_{ir}$ corresponding to different color temperature values are determined through the formula for determining the first factor, multiple times of traversal experiments are required, and each time of traversal experiment is used for determining the first correction factor $\alpha_{ir}$ corresponding to a specific color temperature value. In any time of traversal experiment, it is necessary to calculate the value of $C_{ir}$ through the formula for calculating the infrared light contribution ratio described in the above embodiment, determine the value of $Lux_{vis}$ through actual detection, and determine the value of $Lux_{total}$ by utilizing the exposure statistical information, so as to acquire the first correction factor $\alpha_{ir}$ corresponding to the color temperature value of this time of traversal experiment.

In step S25, it is determined whether to switch from the current night mode to the day mode by utilizing a magnitude relationship between the first visible light illuminance and a first preset illuminance threshold.

It can be seen that in the embodiment, when the first visible light illuminance is determined, the first correction factor corresponding to the color temperature value and used for correcting the infrared light contribution ratio may be determined first, the infrared light contribution ratio obtained based on the white balance statistical information is corrected by utilizing the first correction factor, and then the first visible light illuminance is calculated by utilizing the corrected infrared light contribution ratio. Through the above correction, the obtained corrected infrared light contribution ratio is closer to the actual infrared light contribution ratio, so that the accuracy of the subsequently obtained first visible light illuminance is improved.

Figure 3:
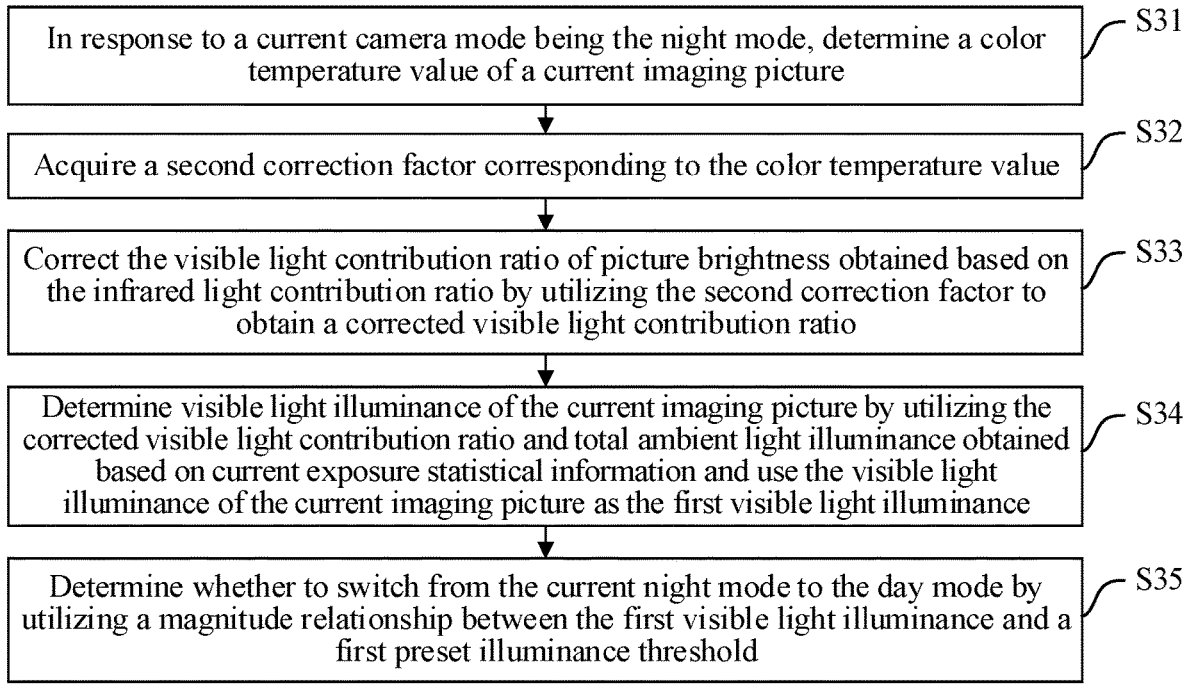
FIG. 3 is a flowchart of a method for switching between a day mode and a night mode according to the present application.

Referring to FIG. 3, an embodiment of the present application provides a method for switching between a day mode and a night mode. The method includes steps described below.

In step S31, in response to a current camera mode being the night mode, a color temperature value of a current imaging picture is determined.

In step S32, a second correction factor corresponding to the color temperature value is acquired.

It should be noted that, the second correction factor in the embodiment is a factor used for correcting the visible light contribution ratio. The above visible light contribution ratio is a parameter determined by utilizing an infrared light contribution ratio obtained based on white balance statistical information. In the use of the camera, since RGB components in the imaging picture change as the color temperature value changes, a deviation exists between the infrared light contribution ratio obtained based on the white balance statistical information and the actual infrared light contribution ratio. Similarly, a deviation is also prone to exist between the actual visible light contribution ratio and the visible light contribution ratio determined by utilizing the infrared light contribution ratio obtained based on the white balance statistical information. To obtain first visible light illuminance in the night mode with a relatively high accuracy subsequently, in the embodiment, the visible light contribution ratio determined by utilizing the infrared light contribution ratio obtained based on the white balance statistical information may be corrected first according to the color temperature value of the current imaging picture, and then the first visible light illuminance is determined by utilizing the corrected visible light contribution ratio.

In step S33, the visible light contribution ratio of picture brightness obtained based on the infrared light contribution ratio is corrected by utilizing the second correction factor to obtain a corrected visible light contribution ratio. The infrared light contribution ratio is an infrared light contribution ratio of the picture brightness obtained based on the white balance statistical information of the current imaging picture.

In step S34, visible light illuminance of the current imaging picture is determined as the first visible light illuminance by utilizing the corrected visible light contribution ratio and total ambient light illuminance obtained based on current exposure statistical information.

In the embodiment, a formula for calculating the first visible light illuminance may be that:

$$Lux_{vis} = Lux_{total}*(1-C_{ir})$$
$$*\alpha_{vis} = Lux_{total}*C_{vis}*\alpha_{vis} = Lux_{total}*C_{vis\text{-}Modified};$$

where $Lux_{vis}$ represents the first visible light illuminance, $Lux_{total}$ represents the total ambient light illuminance, $C_{ir}$ represents the infrared light contribution ratio obtained based on the white balance statistical information of the current imaging picture, $C_{vis}$ represents the visible light contribution ratio obtained based on the infrared light contribution ratio, $\alpha_{vis}$ represents the second correction factor, and $C_{vis\text{-}Modified}$ represents the corrected visible light contribution ratio.

It should be noted that in the embodiment, before step S32, different second correction factors $\alpha_{vis}$ corresponding to different color temperature values may be determined first. In the embodiment, different second correction factors $\alpha_{vis}$ corresponding to different color temperature values may be acquired based on a formula for determining the second factor and in combination with repeated experiments. The formula for determining the second factor may be that:

$$\alpha_{vis} = \frac{Lux_{vis}}{Lux_{total}*C_{vis}} = \frac{Lux_{vis}}{Lux_{total}*(1-C_{ir})}.$$

It is to be understood that when different second correction factors $\alpha_{vis}$ corresponding to different color temperature values are determined through the formula for determining the second factor, multiple times of traversal experiments may be performed, and each time of traversal experiment is used for determining the second correction factor $\alpha_{vis}$ corresponding to a specific color temperature value. In any time of traversal experiment, the value of $C_{ir}$ may be calculated through the formula for calculating the infrared light contribution ratio described in the above embodiment, the value of $Lux_{vis}$ may be determined through actual detection, and the value of $Lux_{total}$ may be determined by utilizing the exposure statistical information, so that the second correction factor $\alpha_{vis}$ corresponding to the color temperature value of this time of traversal experiment is acquired.

In step S25, it is determined whether to switch from the current night mode to the day mode by utilizing a magnitude relationship between the first visible light illuminance and a first preset illuminance threshold.

It can be seen that in the embodiment, when the first visible light illuminance is determined, the second correction factor corresponding to the color temperature value and used for correcting the visible light contribution ratio may be determined first. The visible light contribution ratio is a parameter determined by utilizing the infrared light contribution ratio obtained based on the white balance statistical information. The visible light contribution ratio is corrected by utilizing the second correction factor, and then the first visible light illuminance is calculated by utilizing the corrected visible light contribution ratio. Through the above correction, the obtained corrected visible light contribution ratio is closer to the actual visible light contribution ratio, thus improving the accuracy of the subsequently obtained first visible light illuminance.

Figure 4:
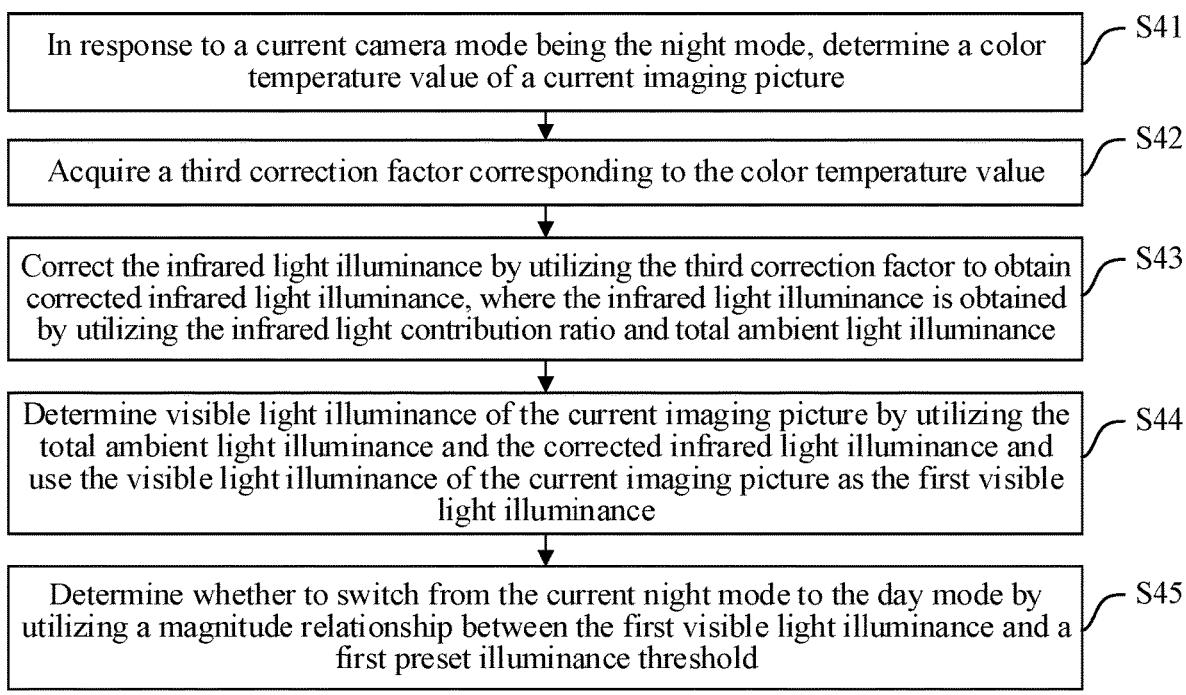
FIG. 4 is a flowchart of a method for switching between a day mode and a night mode according to the present application.

Referring to FIG. 4, an embodiment of the present application provides a method for switching between a day mode and a night mode. The method includes steps described below.

In step S41, in response to a current camera mode being the night mode, a color temperature value of a current imaging picture is determined.

In step S42, a third correction factor corresponding to the color temperature value is acquired.

In the embodiment, the third correction factor is a factor used for correcting infrared light illuminance. In the use of the camera, since RGB components in the imaging picture change as the color temperature value changes, a deviation exists between an infrared light contribution ratio obtained based on white balance statistical information and the actual infrared light contribution ratio. Therefore, a deviation also exists between the infrared light illuminance obtained according to the infrared light contribution ratio and the actual infrared light illuminance. To obtain first visible light illuminance in the night mode with a relatively high accuracy subsequently, in the embodiment, the infrared light illuminance determined by directly utilizing the infrared light contribution ratio obtained based on the white balance statistical information may be corrected first according to the color temperature value of the current imaging picture, and then the first visible light illuminance is determined by utilizing the corrected infrared light illuminance.

In step S43, the infrared light illuminance is corrected by utilizing the third correction factor to obtain corrected infrared light illuminance; where the infrared light illuminance is obtained by utilizing the infrared light contribution ratio and total ambient light illuminance, the infrared light contribution ratio is an infrared light contribution ratio of picture brightness obtained based on the white balance statistical information of the current imaging picture, and the total ambient light illuminance is total ambient light illuminance obtained based on current exposure statistical information.

In step S44, visible light illuminance of the current imaging picture is determined as the first visible light illuminance by utilizing the total ambient light illuminance and the corrected infrared light illuminance.

In the embodiment, a formula for calculating the first visible light illuminance may be that:

$$Lux_{vis}=Lux_{total}-Lux_{ir}*\alpha_{Lux\text{-}ir}=Lux_{total}-(Lux_{total}*C_{ir})*\alpha_{Lux\text{-}ir}=Lux_{total}-Lux_{ir\text{-}Modified};$$

where $Lux_{vis}$ represents the first visible light illuminance, $Lux_{total}$ represents the total ambient light illuminance, $C_{ir}$ represents the infrared light contribution ratio, $Lux_{ir}$ represents the infrared light illuminance obtained by directly utilizing the infrared light contribution ratio $C_{ir}$, $\alpha_{Lux\text{-}ir}$ represents the third correction factor, and $Lux_{ir\text{-}Modified}$ represents the corrected infrared light illuminance.

It should be noted that in the embodiment, before step S42, different third correction factors $\alpha_{Lux\text{-}ir}$ corresponding to different color temperature values may be determined first. In the embodiment, different third correction factors $\alpha_{Lux\text{-}ir}$ corresponding to different color temperature values may be acquired based on a formula for determining the third factor and in combination with repeated experiments. The formula for determining the third factor may be that:

$$\alpha_{Lux\text{-}ir}=\frac{Lux_{total}-Lux_{vis}}{Lux_{total}*C_{ir}}.$$

It is to be understood that when different third correction factors $\alpha_{Lux\text{-}ir}$ corresponding to different color temperature values are determined through the formula for determining the third factor, multiple times of traversal experiments may be performed, and each time of traversal experiment is used for determining the third correction factor $\alpha_{Lux\text{-}ir}$ corresponding to a specific color temperature value. In any time of traversal experiment, it is necessary to calculate the value of $C_{ir}$ through the formula for calculating the infrared light contribution ratio described in the above embodiment, determine the value of $Lux_{vis}$ through actual detection, and determine the value of $Lux_{total}$ by utilizing the exposure statistical information, so as to acquire the third correction factor $\alpha_{Lux\text{-}ir}$ corresponding to the color temperature value of this time of traversal experiment.

In step S45, it is determined whether to switch from the current night mode to the day mode by utilizing a magnitude relationship between the first visible light illuminance and a first preset illuminance threshold.

It can be seen that in the embodiment, when the first visible light illuminance is determined, the third correction factor corresponding to the color temperature value and used for correcting the infrared light illuminance may be determined first, the infrared light illuminance determined by directly utilizing the infrared light contribution ratio obtained based on the white balance statistical information is corrected by utilizing the third correction factor, and then the first visible light illuminance is calculated by utilizing the corrected infrared light illuminance. Through the above correction, the obtained corrected infrared light illuminance is closer to the actual infrared light illuminance, thus improving the accuracy of the subsequently obtained first visible light illuminance.

Figure 5:
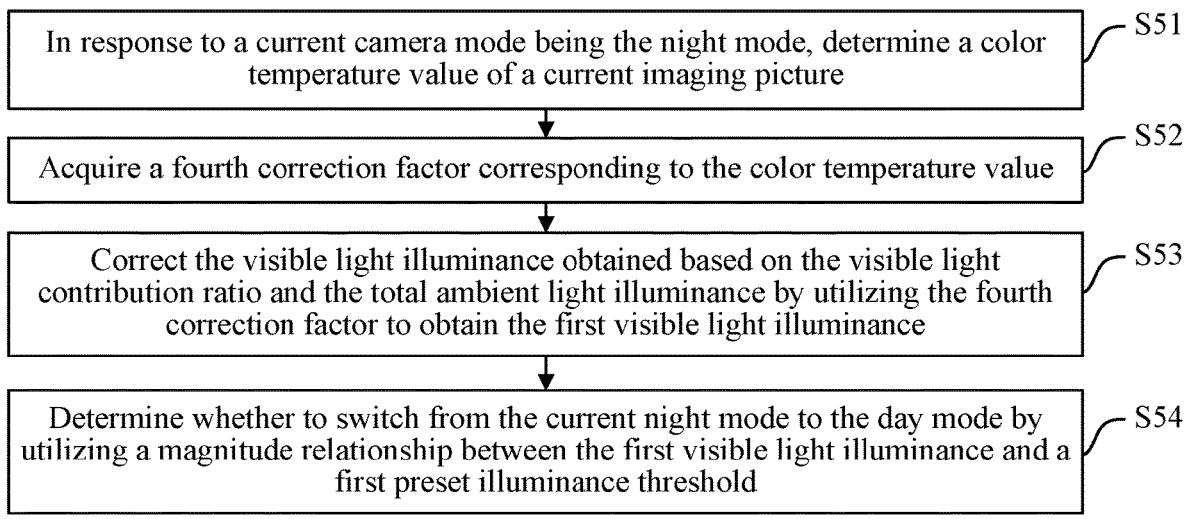
FIG. 5 is a flowchart of a method for switching between a day mode and a night mode according to the present application.

Referring to FIG. 5, an embodiment of the present application provides a method for switching between a day mode and a night mode. The method includes steps described below.

In step S51, in response to a current camera mode being the night mode, a color temperature value of a current imaging picture is determined.

In step S52, a fourth correction factor corresponding to the color temperature value is acquired.

In the embodiment, the fourth correction factor is a factor used for correcting the visible light illuminance. The above visible light illuminance is a parameter obtained by utilizing the visible light contribution ratio and total ambient light illuminance. The visible light contribution ratio is a parameter determined by utilizing an infrared light contribution ratio obtained based on white balance statistical information. In the use of the camera, since RGB components in the imaging picture change as the color temperature value changes, a deviation exists between the infrared light contribution ratio obtained based on the white balance statistical information and the actual infrared light contribution ratio. Similarly, a deviation is also prone to exist between the actual visible light contribution ratio and the visible light contribution ratio determined by utilizing the infrared light contribution ratio obtained based on the white balance statistical information. As a result, a deviation also exists between the actual visible light illuminance and the visible light illuminance determined based on the above visible light contribution ratio. To obtain first visible light illuminance in the night mode with a relatively high accuracy subsequently, in the embodiment, the visible light illuminance determined by directly utilizing the visible light contribution ratio may be corrected first according to the color temperature value of the current imaging picture, and then the first visible light illuminance is determined by utilizing the corrected visible light illuminance.

In step S53, the visible light illuminance obtained based on the visible light contribution ratio and the total ambient light illuminance is corrected by utilizing the fourth correction factor to obtain the first visible light illuminance; where the visible light contribution ratio is obtained by utilizing the infrared light contribution ratio, the infrared light contribution ratio is an infrared light contribution ratio of picture brightness obtained based on the white balance statistical information of the current imaging picture, and the total ambient light illuminance is total ambient light illuminance obtained based on current exposure statistical information.

In the embodiment, a formula for calculating the first visible light illuminance may be that:

$$Lux_{vis}=Lux_{vis}'*\alpha_{Lux\text{-}vis}=Lux_{total}*C_{vis}*\alpha_{Lux\text{-}vis}=(Lux_{total}-Lux_{total}*C_{ir})*\alpha_{Lux\text{-}vis};$$

where $Lux_{vis}$ represents the first visible light illuminance, $Lux_{total}$ represents the total ambient light illuminance, $C_{ir}$ represents the infrared light contribution ratio obtained based on the white balance statistical information of the current imaging picture, $C_{vis}$ represents the visible light contribution ratio obtained based on the infrared light contribution ratio, $Lux_{vis}'$ represents the visible light illuminance obtained by directly utilizing the visible light contribution ratio, and $\alpha_{Lux\text{-}vis}$ represents the fourth correction factor.

It should be noted that in the embodiment, before step S52, different fourth correction factors $\alpha_{Lux\text{-}vis}$ corresponding to different color temperature values may be determined first. In the embodiment, different fourth correction factors $\alpha_{Lux\text{-}vis}$ corresponding to different color temperature values may be acquired based on a formula for determining the fourth factor and in combination with repeated experiments. The formula for determining the fourth factor may be that:

$$\alpha_{Lux-vis} = \frac{Lux_{vis}}{Lux_{total} * C_{vis}} = \frac{Lux_{vis}}{Lux_{total} * (1 - C_{ir})}.$$

It is to be understood that when different fourth correction factors $\alpha_{Lux-vis}$ corresponding to different color temperature values are determined through the formula for determining the fourth factor, multiple times of traversal experiments are required, and each time of traversal experiment is used for determining the fourth correction factor $\alpha_{Lux-vis}$ corresponding to a specific color temperature value. In any time of traversal experiment, it is necessary to calculate the value of $C_{ir}$ through the formula for calculating the infrared light contribution ratio described in the above embodiment, determine the value of $Lux_{vis}$ through actual detection, and determine the value of $Lux_{total}$ by utilizing the exposure statistical information, so as to acquire the fourth correction factor $\alpha_{Lux-vis}$ corresponding to the color temperature value of this time of traversal experiment.

In step S54, it is determined whether to switch from the current night mode to the day mode by utilizing a magnitude relationship between the first visible light illuminance and a first preset illuminance threshold.

It can be seen that in the embodiment, when the first visible light illuminance is determined, the fourth correction factor corresponding to the color temperature value and used for correcting the visible light illuminance may be determined first. The above visible light illuminance is a parameter obtained by utilizing the visible light contribution ratio and the total ambient light illuminance, and the visible light contribution ratio is a parameter determined by utilizing the infrared light contribution ratio obtained based on the white balance statistical information. Then, the visible light illuminance obtained by directly utilizing the visible light contribution ratio is corrected by utilizing the fourth correction factor, so that the corrected visible light illuminance is obtained, that is, the first visible light illuminance is obtained. Through the above correction, the obtained corrected visible light illuminance is closer to the actual visible light illuminance, thus improving the accuracy of the subsequently obtained first visible light illuminance.

Figure 6:
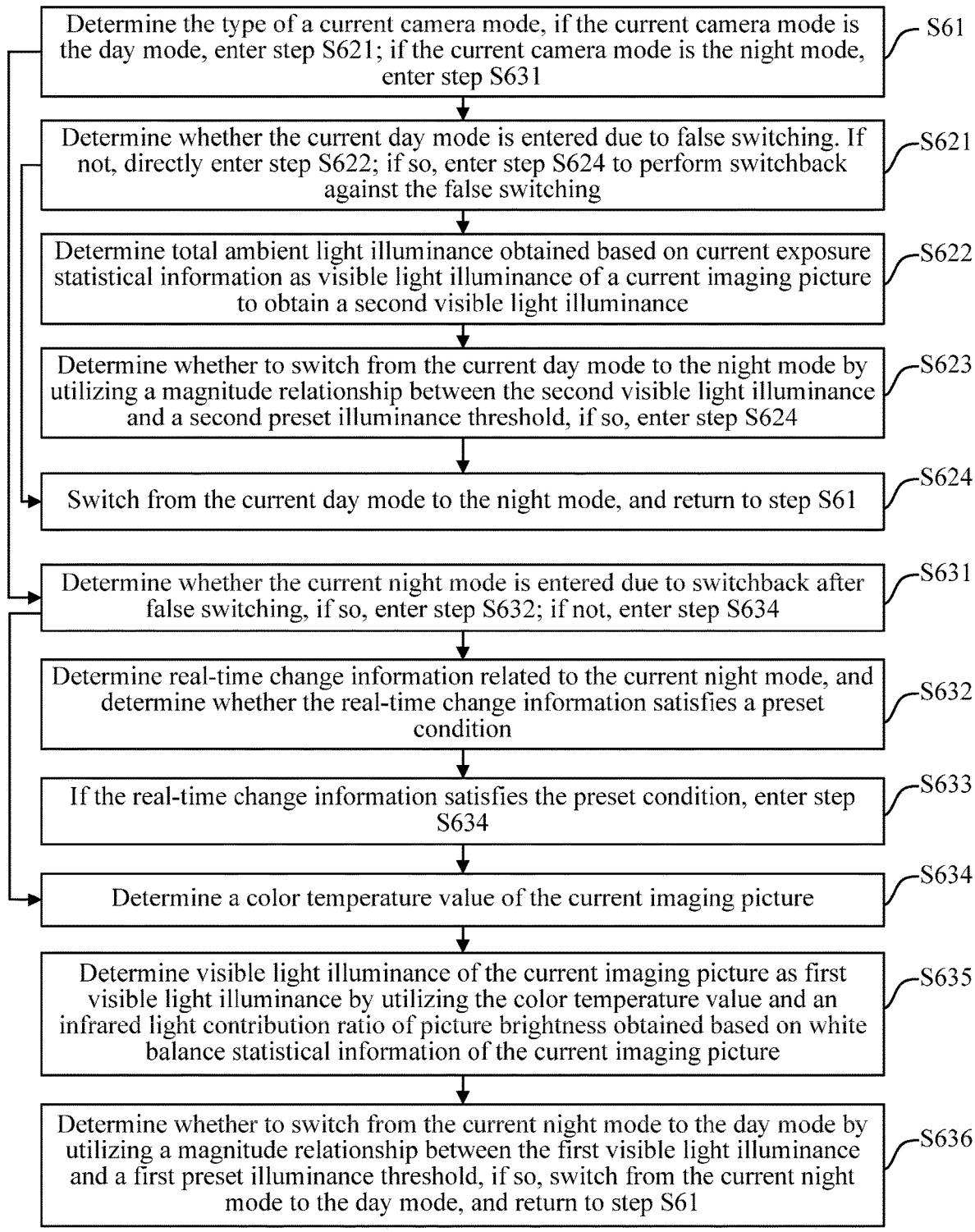
FIG. 6 is a flowchart of a method for switching between a day mode and a night mode according to the present application.

Referring to FIG. 6, an embodiment of the present application provides a method for switching between a day mode and a night mode. The method includes steps described below.

In step S61, the type of a current camera mode is determined. If the current camera mode is the day mode, step S621 is executed; and if the current camera mode is the night mode, step S631 is executed.

In step S621, it is determined whether the current day mode is entered due to false switching. If it is determined that the current day mode is entered not due to the false switching, step S622 is directly executed; if it is determined that the current day mode is entered due to the false switching, step S624 is executed to perform switchback against the false switching.

In step S622, total ambient light illuminance obtained based on current exposure statistical information is determined as visible light illuminance of a current imaging picture to obtain a second visible light illuminance.

In step S623, it is determined whether to switch from the current day mode to the night mode by utilizing a magnitude relationship between the second visible light illuminance and a second preset illuminance threshold. If it is determined to switch from the current day mode to the night mode, step S624 is executed.

It is to be understood that the second preset illuminance threshold is a preset illuminance threshold used when it is determined whether it is required to switch from the day mode to the night mode. If the second visible light illuminance is less than the second preset illuminance threshold, it is determined that it is required to switch from the current day mode to the night mode; if the second visible light illuminance is greater than or equal to the second preset illuminance threshold, it is determined that mode switching is not required and the current day mode is kept unchanged. In the embodiment, the second preset illuminance threshold may be set according to actual requirements.

In step S624, the current day mode is switched to the night mode, and step S61 is returned to.

In step S631, it is determined whether the current night mode is entered due to switchback after false switching. If it is determined that the current night mode is entered due to the switchback after the false switching, step S632 is executed; and if it is determined that the current night mode is entered not due to the switchback after the false switching, step S634 is executed.

In step S632, real-time change information related to the current night mode is determined, and it is determined whether the real-time change information satisfies a preset condition.

In step S633, if it is determined that the real-time change information satisfies the preset condition, step S634 is executed.

In step S634, a color temperature value of the current imaging picture is determined.

In step S635, visible light illuminance of the current imaging picture is determined by utilizing the color temperature value and an infrared light contribution ratio of picture brightness obtained based on white balance statistical information of the current imaging picture and used as first visible light illuminance.

In step S636, it is determined whether to switch from the current night mode to the day mode by utilizing a magnitude relationship between the first visible light illuminance and a first preset illuminance threshold. If it is determined to switch from the current night mode to the day mode, the current night mode is switched to the day mode, and step S61 is returned to.

It should be noted that in the embodiment, the step of determining whether the current day mode is entered due to the false switching may include steps described below. The total ambient light illuminance obtained based on the current exposure statistical information is determined as the visible light illuminance of the current imaging picture to obtain third visible light illuminance, and it is determined whether the third visible light illuminance is less than the second preset illuminance threshold. If the third visible light illuminance is less than the second preset illuminance threshold, it is determined that the current day mode is entered due to the false switching; if the third visible light illuminance is not less than the second preset illuminance threshold, it is determined that the current day mode is entered due to normal switching. That is, in the embodiment, when it is determined whether the false switching of the camera occurs, the determination is performed in the day mode, and whether the false switching event occurs is determined according to a magnitude relationship between the second preset illuminance threshold and the visible light illuminance obtained based on the exposure statistical information in the day mode. In the embodiment, the reason why whether the false switching occurs is determined in the above manner is that it is prone to cause repeated switching between the day mode and the night mode in a dusk period, the visible light illuminance acquired in the day mode has a higher accuracy than the visible light illuminance acquired in the night mode. Therefore, in the present application, when the camera is in the day mode, the total ambient light illuminance obtained based on the current exposure statistical information is used as the visible light illuminance and compared with the second preset illuminance threshold to determine whether the false switching event occurs. If it is determined that the false switching occurs, the switchback is performed, that is, the current day mode is switched to the night mode, so that the camera mode of the camera after the switchback is consistent with the actual situation of the surrounding environment.

Figure 7:
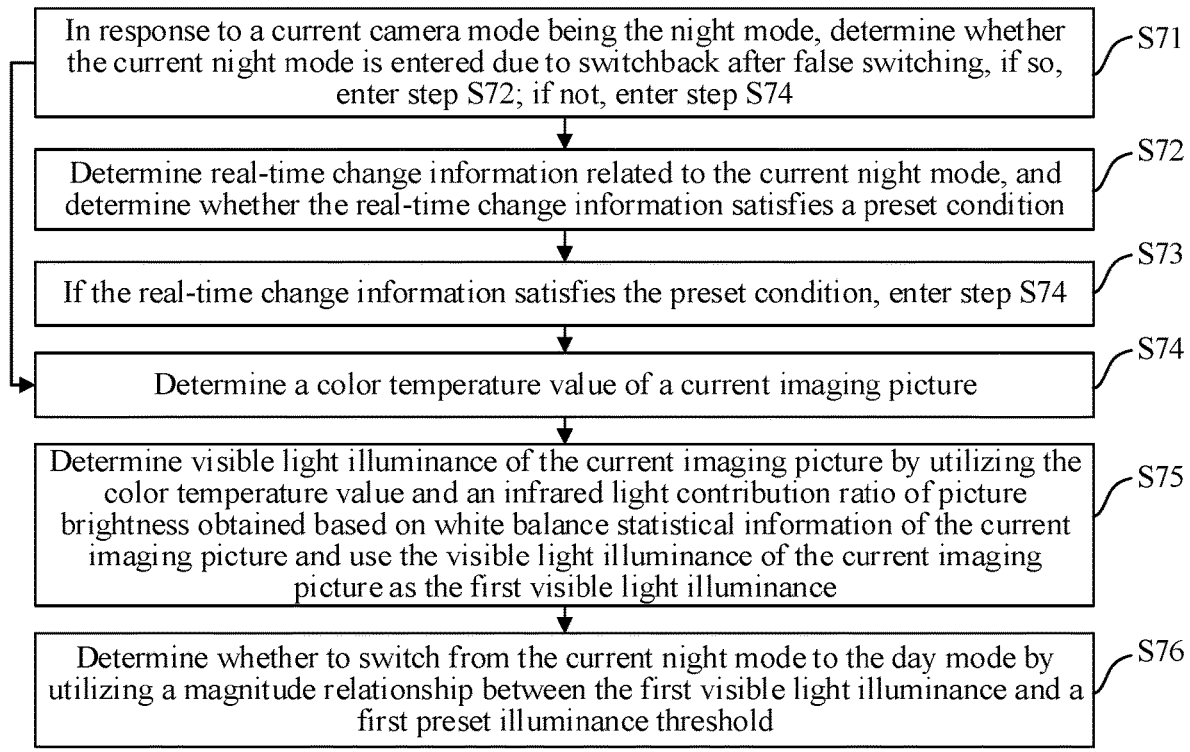
FIG. 7 is a flowchart of a method for switching between a day mode and a night mode according to the present application.

Referring to FIG. 7, an embodiment of the present application provides a method for switching between a day mode and a night mode. The method includes steps described below.

In step S71, in response to a current camera mode being the night mode, it is determined whether the current night mode is entered due to switchback after false switching. If it is determined that the current night mode is entered due to the switchback after the false switching, step S72 is executed; and if it is determined that the current night mode is entered not due to the switchback after the false switching, step S74 is executed.

It is to be understood in the embodiment, whether the current night mode is entered due to the switchback after the false switching may be determined in multiple manners. One implementation includes that when the night mode is entered due to a switchback event after false switching, the corresponding log information of the switchback event may be recorded, and the log information of the switchback event is bound with the night mode entered after the switchback; when the background monitors that the current camera mode is the night mode, a retrieval operation may be performed in view of the night mode to determine whether the night mode is bound with the log information of the switchback event, so as to determine whether the night mode is entered due to switchback after false switching. Another implementation includes that when the night mode is entered due to the switchback event after the false switching, a preset marker may be added to the night mode; when the background monitors that the current camera mode is the night mode, whether the night mode carries the preset marker may be retrieved, so as to determine whether the night mode is entered due to switchback after false switching.

In step S72, real-time change information related to the current night mode is determined, and it is determined whether the real-time change information satisfies a preset condition.

In step S73, if it is determined that the real-time change information satisfies the preset condition, step S74 is executed.

In step S74, a color temperature value of a current imaging picture is determined.

In one implementation, the step in which the real-time change information related to the current night mode is determined, and it is determined whether the real-time change information satisfies the preset condition may include steps described below. A real-time duration of the current night mode is determined, and it is determined whether the real-time duration reaches a preset duration threshold; and if the real-time duration reaches the preset duration threshold, it is determined that the real-time change information satisfies the preset condition. That is, in the embodiment, if the night mode of the camera is entered due to switchback caused by false switching, at this time, the step in which the color temperature value of the current imaging picture is determined may not be initiated immediately, that is, the day mode or the night mode is not determined immediately, but a period of time is waited until the real-time duration of the current night mode reaches the preset duration threshold, and then the step of determining the color temperature value of the current imaging picture is allowed to be initiated. In this way, repeated switching between the day mode and the night mode can be further reduced.

In another implementation, the step in which the real-time change information related to the current night mode is determined and it is determined whether the real-time change information satisfies the preset condition may include steps described below. A real-time accumulated change of imaging pictures of the current night mode is determined, and it is determined whether the real-time accumulated change is greater than a preset change threshold; and if the real-time accumulated change is greater than the preset change threshold, it is determined that the real-time change information satisfies the preset condition. That is, in the embodiment, if the night mode of the camera is entered due to switchback caused by false switching, at this time, the step in which the color temperature value of the current imaging picture is determined may not be initiated immediately, but a period of time is waited until the real-time accumulated change of the imaging pictures reaches the preset change threshold, and then the step of determining the color temperature value of the current imaging picture is allowed to be initiated. In this way, repeated switching between the day mode and the night mode can be further reduced.

In step S75, visible light illuminance of the current imaging picture is determined by utilizing the color temperature value and an infrared light contribution ratio of picture brightness obtained based on white balance statistical information of the current imaging picture and used as first visible light illuminance.

In step S76, it is determined whether to switch from the current night mode to the day mode by utilizing a magnitude relationship between the first visible light illuminance and a first preset illuminance threshold.

It can be seen that in the embodiment, if the night mode of the camera is entered due to switchback caused by false switching, at this time, the step in which the color temperature value of the current imaging picture is determined may not be initiated immediately, but the real-time change information related to the current night mode is determined first; when the real-time change information satisfies the preset condition, the step of determining the color temperature value of the current imaging picture is allowed to be initiated. In this way, repeated switching between the day mode and the night mode can be further reduced.

Figure 8:
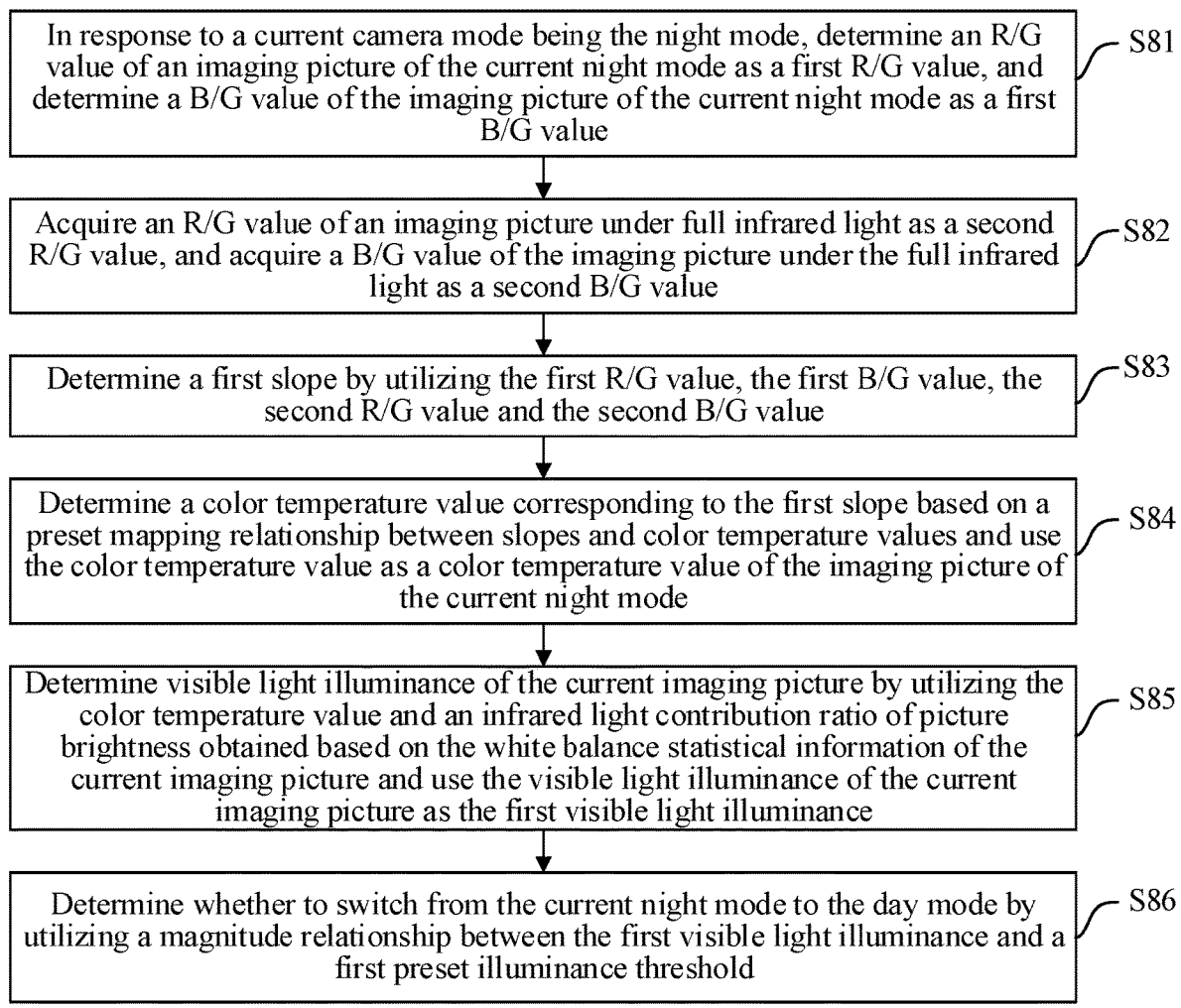
FIG. 8 is a flowchart of a method for switching between a day mode and a night mode according to the present application.

Referring to FIG. 8, an embodiment of the present application provides a method for switching between a day mode and a night mode. The method includes steps described below.

In step S81, in response to a current camera mode being the night mode, an R/G value of an imaging picture of the current night mode is determined as a first R/G value, and a B/G value of the imaging picture of the current night mode is determined as a first B/G value.

It should be noted that in the embodiment, the R/G value and the B/G value of the current imaging picture may be determined as the first R/G value and the first B/G value by utilizing white balance statistical information of the imaging picture of the current night mode.

In step S82, an R/G value of an imaging picture under full infrared light is acquired as a second R/G value, and a B/G value of the imaging picture under the full infrared light is acquired as a second B/G value.

In step S83, a first slope is determined by utilizing the first R/G value, the first B/G value, the second R/G value and the second B/G value.

In step S84, a color temperature value corresponding to the first slope is determined based on a preset mapping relationship between slopes and color temperature values and used as a color temperature value of the imaging picture under the current night mode (that is, the color temperature value of the current imaging picture).

The first slope satisfies that:

$$\tan\theta_1 = \frac{B_2/G_2 - B_1/G_1}{R_2/G_2 - R_1/G_1};$$

where $\tan\theta_1$ represents the first slope, $B_1/G_1$ represents the first B/G value, $R_1/G_1$ represents the first R/G value, $B_2/G_2$ represents the second B/G value, and $R_2/G_2$ represents the second R/G value.

In step S85, visible light illuminance of the current imaging picture is determined by utilizing the color temperature value and an infrared light contribution ratio of picture brightness obtained based on the white balance statistical information of the current imaging picture and used as first visible light illuminance.

In step S86, it is determined whether to switch from the current night mode to the day mode by utilizing a magnitude relationship between the first visible light illuminance and a first preset illuminance threshold.

It should be noted that the mapping relationship in the embodiment records a corresponding between slopes and color temperature values. In the embodiment, the mapping relationship may be recorded in a table-based manner. In the embodiment, when the visible light illuminance is unchanged, different color temperature values correspond to different slope ranges. In the case where the visible light illuminance and the color temperature value remain unchanged, as an infrared light strength gradually increases, the slope is basically unchanged, that is, no change occurs or the change is relatively small. In addition, as the color temperature value decreases, the angel $\theta$ corresponding to the slope $\tan\theta$ gradually increases. Secondly, in the case where the infrared light strength gradually increases, the B/G value and the R/G value of the imaging picture gradually approximate the R/G value and the B/G value of the imaging picture under the full infrared light, that is, approximate the second R/G value and the second B/G value.

Figure 9:
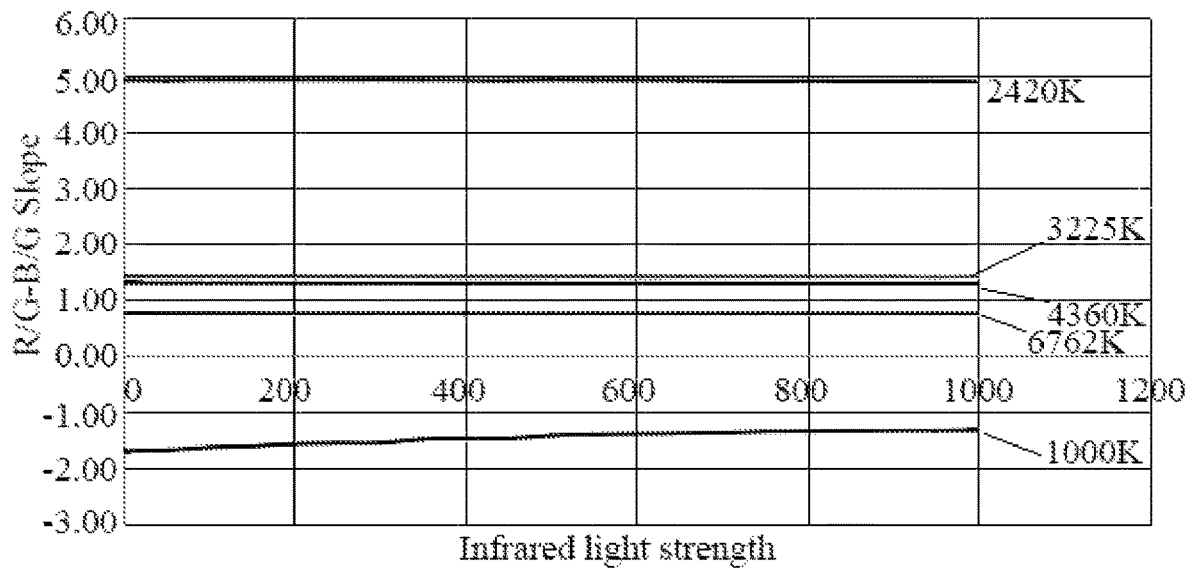
FIG. 9 is a trend graph of an infrared light strength and a slope according to the present application.

The above rule may be reflected in FIG. 9. FIG. 9 is a trend graph of infrared light strengths and slopes under different color temperature value conditions. Data corresponding to each trend line in FIG. 9 reflects the R/G-B/G slope, the infrared light strength and the corresponding color temperature value recorded when the infrared light strength gradually increases, the color temperature value and the visible light illuminance remain constant, and the visible light illuminance is at a low-illuminance level. It is to be understood that the reason why the visible light illuminance is kept at the low-illuminance level in the above data collection experiment is to make the experimental environment more fit the low-illuminance environment of the camera which is prone to cause repeated switching between the day mode and night mode, such as a dusk period.

It can be seen that in the case where the color temperature value and the visible light illuminance remain unchanged, for any infrared light strength in the night mode, the slope between the R/G value and the B/G value of the corresponding imaging picture and the corresponding R/G value and the B/G value under full infrared light is basically unchanged. Therefore, after the first slope is calculated, the corresponding color temperature value may be determined through the mapping relationship corresponding to the corresponding visible light illuminance.

Figure 10:
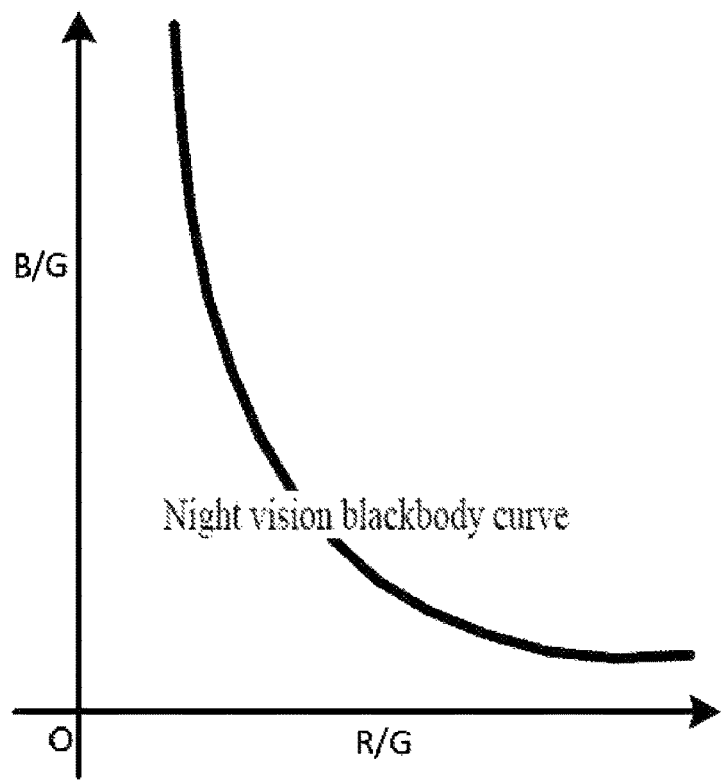
FIG. 10 is a graph showing a night vision blackbody curve irrespective of the impact of infrared light.
Figure 11:
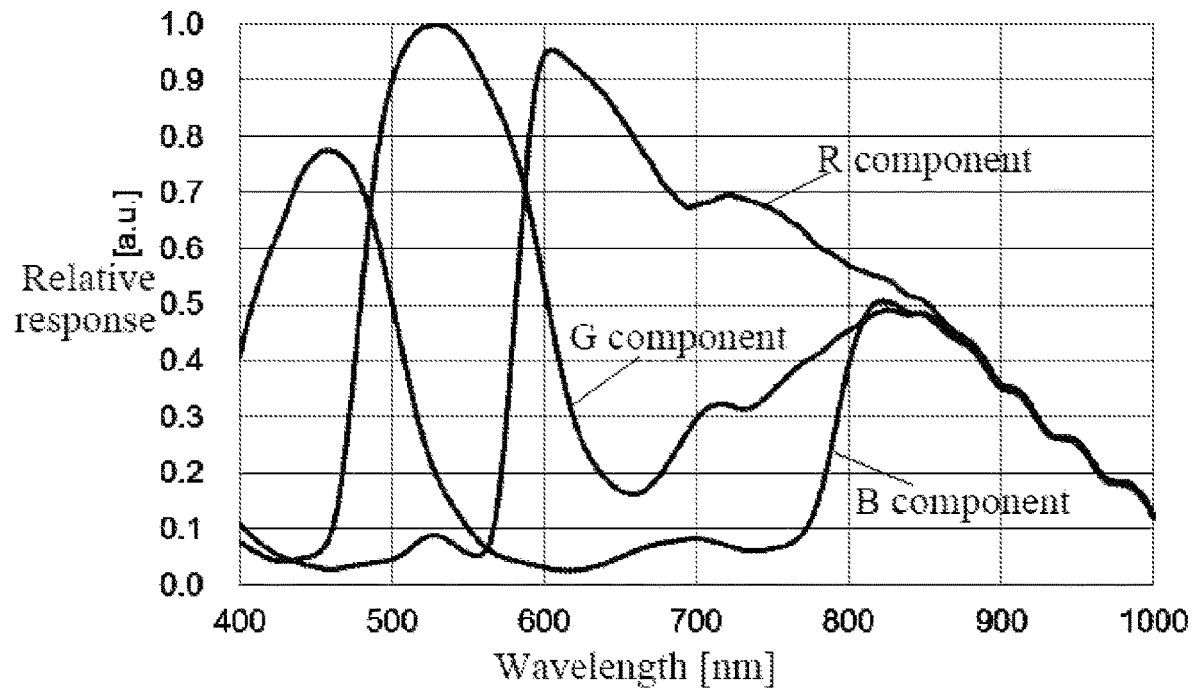
FIG. 11 is a graph showing a spectral response curve of an image sensor.

In the embodiment, as the infrared light strength gradually increases, the slope is basically unchanged, and the R/G value and the B/G value of the imaging picture gradually approximate the second R/G value and the second R/G value. This rule may be obtained by analyzing the trend lines in FIG. 9, and may also be obtained through theoretical analysis in the embodiment. Referring to FIGS. 10 and 11, FIG. 10 is a graph showing a night vision blackbody curve irrespective of the impact of infrared light, and FIG. 11 is a graph showing a spectral response curve of an image sensor. It can be seen from FIG. 11 that the R component, the G component and the B component of the image sensor have the consistent response to the infrared light. Based on this characteristic, it is assumed that the additional response of each component to the infrared light is A, the original coordinate point A irrespective of the impact of infrared light is set to $A=(R_{before}/G_{before}, B_{before}/G_{before})$, then when the effect of infrared light is considered, the corresponding coordinate point A' becomes the following:

$$A' = \left( \frac{R_{before} + \Delta}{G_{before} + \Delta}, \frac{B_{before} + \Delta}{G_{before} + \Delta} \right).$$

It can be seen that the corresponding vector of the above change is that:

$$\overrightarrow{AA'} = \left( \frac{\Delta(G_{before} - R_{before})}{G_{before}(G_{before} + \Delta)}, \frac{\Delta(G_{before} - B_{before})}{G_{before}(G_{before} + \Delta)} \right).$$

The slope corresponding to the above vector satisfies that:

$$\tan\theta = \frac{G_{before} - B_{before}}{G_{before} - R_{before}} = \frac{1 - \frac{B_{before}}{G_{before}}}{1 - \frac{R_{before}}{G_{before}}}.$$

Firstly, it can be seen from the above expression of the slope that the change of the above slope has nothing to do with the additional response A of the infrared light, that is, the change of the above slope has nothing to do with the infrared light strength.

$$\tan\theta = \left( 1 - \frac{B_{before}}{G_{before}} \right) \bigg/ \left( 1 - \frac{R_{before}}{G_{before}} \right)$$

Figure 12:
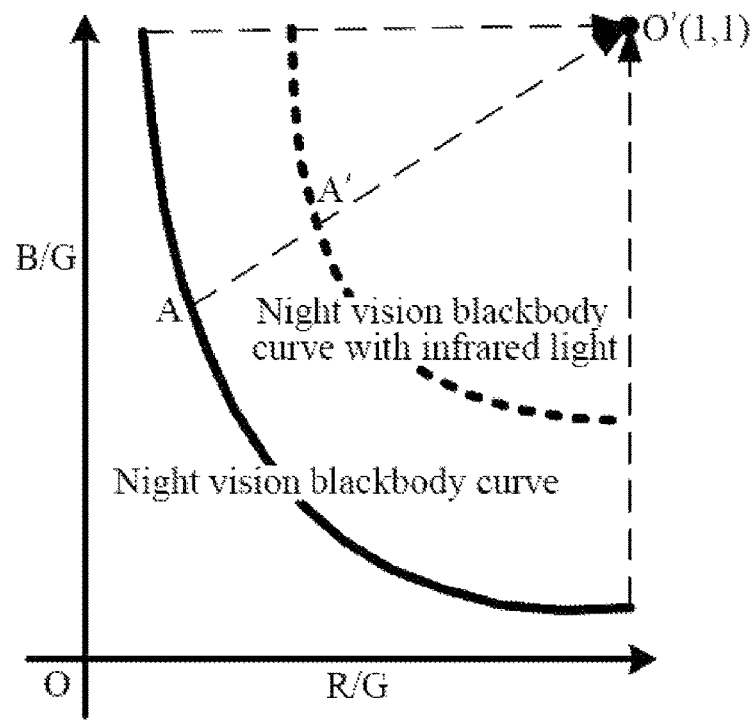
FIG. 12 is a trend graph of a night vision blackbody curve changing with an infrared light strength considering the impact of infrared light.

Secondly, considering that the expression that is equivalent to the slope formed between the coordinate point (1, 1) and the coordinate point A $$A = \left(\frac{R_{before}}{G_{before}}, \frac{B_{before}}{G_{before}}\right),$$

satisfying it can be seen that the coordinate point (1, 1), the coordinate point A and the coordinate A' are all on the same straight line as shown in FIG. 12.

Thirdly, according to the expression of the above coordinate point A', it can be seen that:

$$A' = \left(\frac{1 + \frac{R_{before}}{\Delta}}{1 + \frac{G_{before}}{\Delta}}, \frac{1 + \frac{B_{before}}{\Delta}}{1 + \frac{G_{before}}{\Delta}}\right).$$

It can be seen that when $\Delta = R_{before}$, $G_{before}$, $B_{before}$, the coordination point A' approximates (1, 1) as shown in FIG. 12. The above coordinate point (1, 1) is relatively close to the R/G value of (1.0661) and the B/G value of (1.0073) under full infrared light. It can be seen that when the infrared light strength gradually increases, the R/G value and the B/G value of the imaging picture gradually approximate the R/G value and the B/G value under full infrared light, that is, approximate the second R/G value and the second B/G value.

From the above theoretical analysis, it can be seen that with the increase of the infrared light strength, the slope is basically unchanged, and the R/G value and the B/G value of the imaging picture gradually approximate the second R/G value and the second B/G value.

Figure 13:
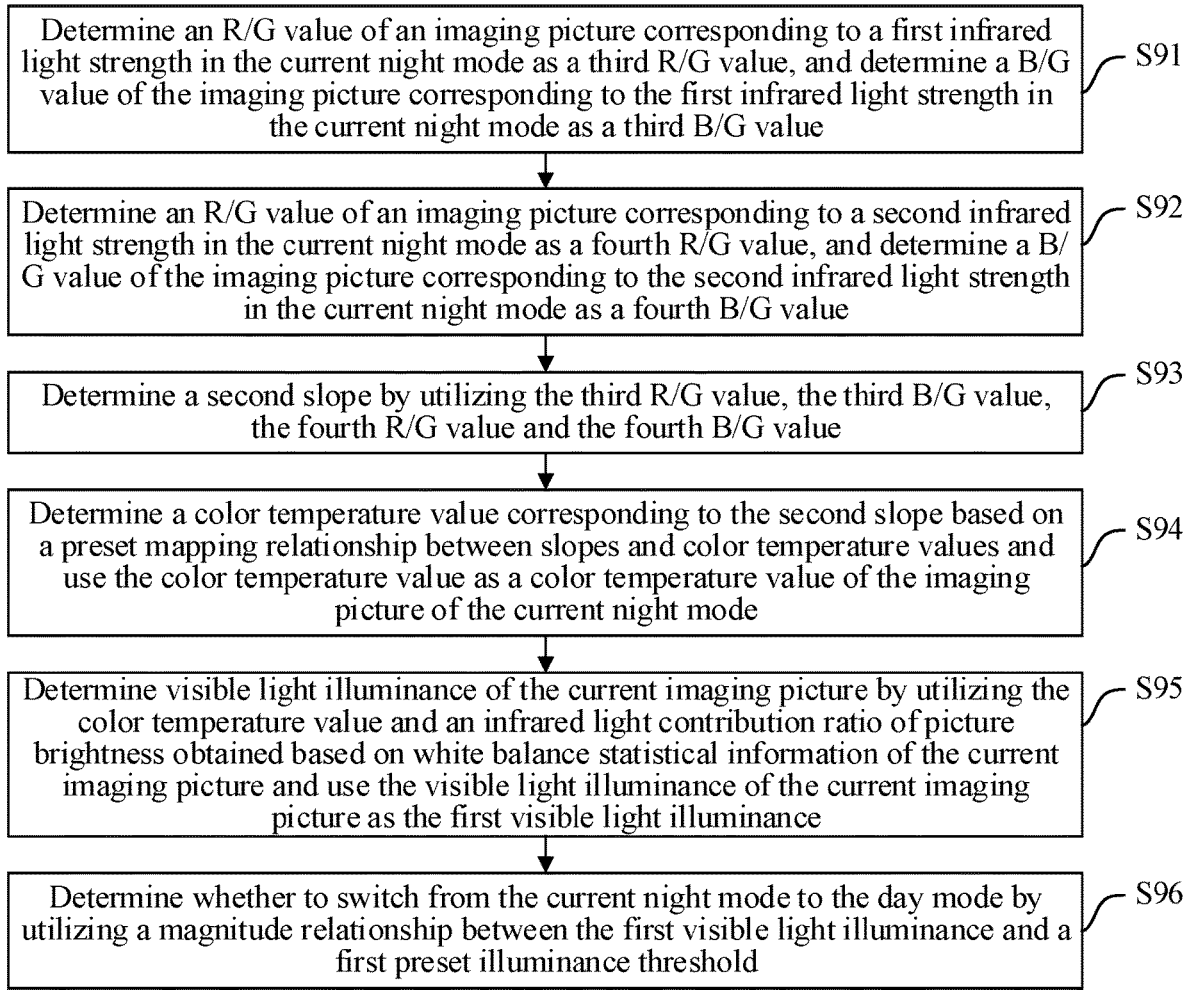
FIG. 13 is a flowchart of a method for switching between a day mode and a night mode according to the present application.

Referring to FIG. 13, an embodiment of the present application provides a method for switching between a day mode and a night mode. The method includes steps described below.

In step S91, an R/G value of an imaging picture corresponding to a first infrared light strength in the current night mode is determined as a third R/G value, and a B/G value of the imaging picture corresponding to the first infrared light strength in the current night mode is determined as a third B/G value.

In the embodiment, it may be that in the case where the infrared light strength of the infrared lamp is the first infrared light strength, the R/G value and the B/G value of a current imaging picture are determined respectively as the third R/G value and the third B/G value by utilizing white balance statistical information of the current imaging picture.

In step S92, an R/G value of an imaging picture corresponding to a second infrared light strength in the current night mode is determined as a fourth R/G value, and a B/G value of the imaging picture corresponding to the second infrared light strength in the current night mode is determined as a fourth B/G value.

In the embodiment, it may be that in the case where the infrared light strength of the infrared lamp is the second infrared light strength, the R/G value and the B/G value of the current imaging picture are determined respectively as the fourth R/G value and the fourth B/G value by utilizing the white balance statistical information of the current imaging picture.

It is to be understood that before the above step S92, the power of the infrared lamp needs to be adjusted to adjust the infrared light strength from the first infrared light strength to the second infrared light strength.

It should be noted that the numerical value of the first infrared light strength and the numerical value of the second infrared light strength in the embodiment may be preset, and of course, may also be values determined in real time by the camera according to the actual visible light illuminance of the surrounding environment. It is to be understood that when the actual visible light illuminance of the surrounding environment is relatively low, the numerical value of the first infrared light strength and the numerical value of the second infrared light strength may be appropriately adjusted larger. When the actual visible light illuminance of the surrounding environment is relatively high, the numerical value of the first infrared light strength and the numerical value of the second infrared light strength may both be appropriately adjusted smaller. In addition, the numerical value of the second infrared light strength and the numerical value of the first infrared light strength need to be different, and to ensure the accuracy of subsequent calculations, it may be appropriately ensured that a relatively large difference exists between the second infrared light strength and the first infrared light strength.

Moreover, it should to be further noted that the time difference between the execution time of step S91 and the execution time of step S92 should be controlled within a relatively short range and should not be too large, so as to ensure that the strength of visible light in the environment when step S91 is executed is consistent with the strength of visible light in the environment when step S92 is executed.

In step S93, a second slope is determined by utilizing the third R/G value, the third B/G value, the fourth R/G value and the fourth B/G value.

The second slope is that:

$$\tan\theta_2 = \frac{B_4/G_4 - B_3/G_3}{R_4/G_4 - R_3/G_3};$$

where $\tan\theta_2$ represents the second slope, $B_3/G_3$ represents the third B/G value, $R_3/G_3$ represents the third R/G value, $B_4/G_4$ represents the fourth B/G value, and $R_4/G_4$ represents the fourth R/G value.

In step S94, a color temperature value corresponding to the second slope is determined based on a preset mapping relationship between slopes and color temperature values and used as a color temperature value of the imaging picture of the current night mode (that is, a color temperature value of the current imaging picture).

It should be noted that as shown in FIG. 9, in the case where the color temperature value and the visible light illuminance remain unchanged, for any two infrared light strengths with different numerical values, slopes corresponding to the R/G value and the B/G value of the corresponding two imaging pictures are basically unchanged. Therefore, after the second slope is calculated, the corresponding color temperature value may be determined through the mapping relationship corresponding to the corresponding visible light illuminance.

In step S95, visible light illuminance of the current imaging picture is determined by utilizing the color temperature value and an infrared light contribution ratio of picture brightness obtained based on white balance statistical information of the current imaging picture and used as first visible light illuminance.

In step S96, it is determined whether to switch from the current night mode to the day mode by utilizing a magnitude relationship between the first visible light illuminance and a first preset illuminance threshold.

Figure 14:
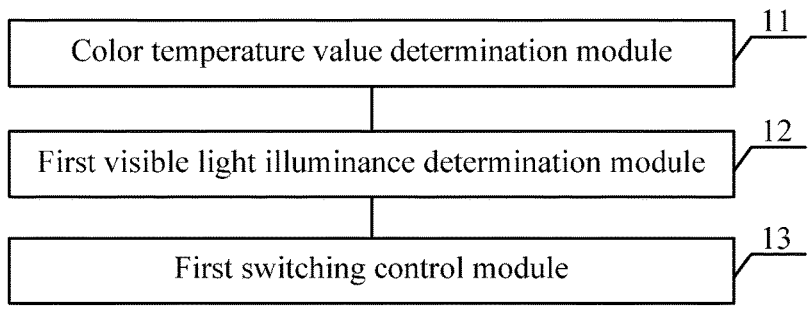
FIG. 14 is a structural diagram of an apparatus for switching between a day mode and a night mode according to the present application.

Referring to FIG. 14, an embodiment of the present application provides an apparatus for switching between a day mode and a night mode. The apparatus includes a color temperature value determination module 11, a first visible light illuminance determination module 12 and a first switching control module 13.

The color temperature value determination module 11 is configured to in response to a current camera mode being the night mode, determine a color temperature value of a current imaging picture.

The first visible light illuminance determination module 12 is configured to determine visible light illuminance of the current imaging picture by utilizing the color temperature value and an infrared light contribution ratio of picture brightness obtained based on white balance statistical information of the current imaging picture and use the visible light illuminance of the current imaging picture as first visible light illuminance.

The first switching control module 13 is configured to determine whether to switch from the current night mode to the day mode by utilizing a magnitude relationship between the first visible light illuminance and a first preset illuminance threshold.

For the working process of the above various modules, reference may be made to the corresponding content in the above embodiments, which is not repeated here.

It can be seen that in the embodiment of the present application, the visible light illuminance in the night mode is determined by utilizing the color temperature value and the infrared light contribution ratio obtained based on the white balance statistical information. That is, in the embodiment of the present application, during the process of determining the visible light illuminance in the night mode, not only the impact of the infrared light contribution ratio obtained based on the white balance statistical information on the visible light illuminance is considered, but also the impact of the color temperature value of the imaging picture in the current night mode on the visible light illuminance is further considered. In the embodiment of the present application, the reason why the impact of the color temperature value in the night mode on the visible light illuminance is considered is that infrared light projected in the night mode changes the color temperature value of the imaging picture, and RGB components in the imaging picture change as the color temperature value changes so that the visible light illuminance calculated irrespective of the impact of the color temperature value deviates from the actual visible light illuminance. Therefore, if the visible light illuminance in the night mode is determined only according to the infrared light contribution ratio obtained based on the white balance statistical information, the obtained visible light illuminance includes not only the illuminance generated under the impact of the visible light, but also the illuminance generated under the impact of the infrared light, so that the above calculated visible light illuminance deviates from the actual visible light illuminance. It can be seen that in the embodiment of the present application, the impact of the color temperature value in the night mode is further considered, so that the accuracy of the finally acquired visible light illuminance in the night mode is further improved, the deviation from the actual visible light illuminance is reduced, so that the repeated switching between the day mode and the night mode is effectively improved.

Figure 15:
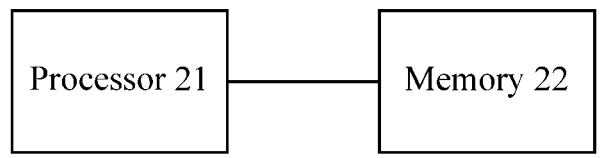
FIG. 15 is a structural diagram of a device for switching between a day mode and a night mode according to the present application.

Referring to FIG. 15, an embodiment of the present application further discloses a device for switching between a day mode and a night mode. The device includes a processor 21 and a memory 22.

The memory 22 is configured to store a computer program.

The processor 21 is configured to execute the computer program to implement the method for switching between a day mode and a night mode of the above embodiments.

For steps of the above method for switching between a day mode and a night mode, reference may be made to the corresponding content in the above embodiments, which are not repeated here.

Figure 16:
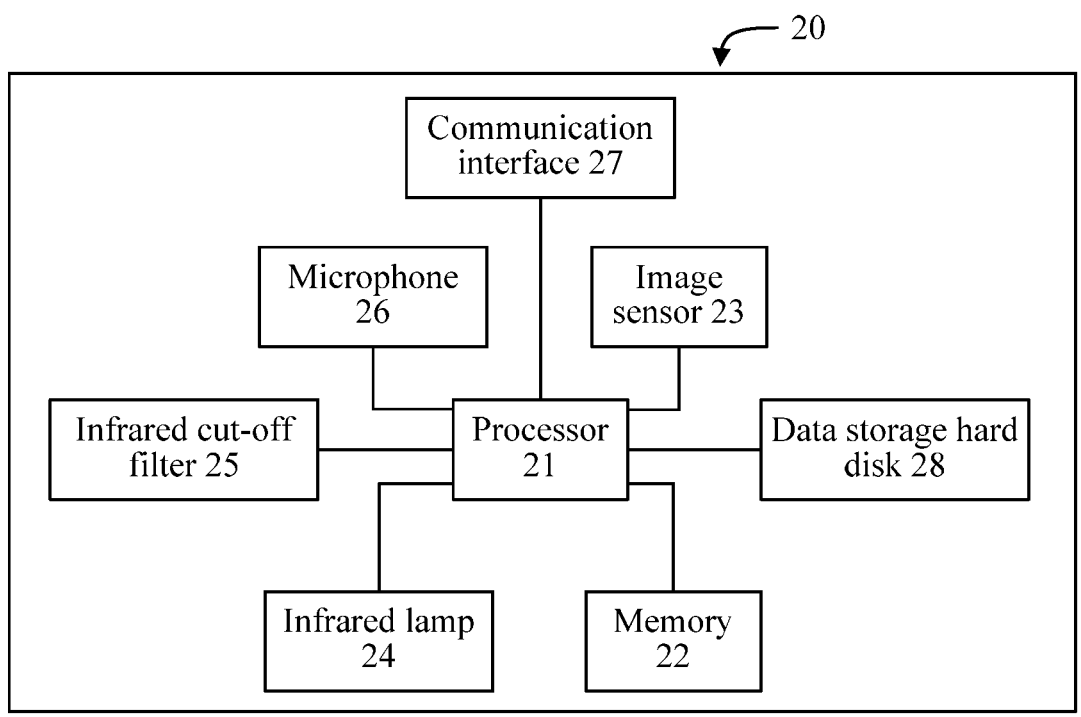
FIG. 16 is a structural diagram of a camera according to the present application.

Referring to FIG. 16, an embodiment of the present application further discloses a camera 20. The camera 20 includes the above device for switching between a day mode and a night mode, and the device for switching between a day mode and a night mode includes the processor 21 and the memory 22 of the above embodiments The camera 20 in the embodiment may further include an image sensor 23, an infrared lamp 24, an infrared cut-off filter 25, a microphone 26, a communication interface 27 and a data storage hard disk 28.

The image sensor 23 is configured to collect images to obtain corresponding picture data.

The infrared lamp 24 is configured to project infrared light to the surrounding environment.

The infrared cut-off filter 25 is configured to filter infrared light to prevent the infrared light from entering the image sensor 23 in a turned-on state and allow the infrared light to pass through and enter the image sensor 23 in a turned-off state.

The microphone 26 is configured to collect sound data of the surrounding environment.

The communication interface 27 is configured to transmit the picture data collected by the image sensor 23 and/or the sound data collected by the microphone 26 to a corresponding monitoring terminal in a wireless communication manner and/or a wired communication manner, or to receive a control instruction transmitted by the monitoring terminal for controlling the operating state of the camera 20.

The data storage hard disk 28 is configured to locally store the picture data collected by the image sensor 23 and/or the sound data collected by the microphone 26.

Of course, in addition to disposing the above various device modules in the camera 20, other device modules that need to be used may also be added to the camera 20 according to actual requirements, which are not limited one by one here.

The present application further discloses a computer-readable storage medium configured to store a computer program, when the computer program is executed by a processor, the method for switching between a day mode and a night mode of the above embodiments is implemented. For the steps of the method, reference may be made to the corresponding content in the above embodiments, which are not repeated here.

The embodiments in this Description are described in a progressive manner. Each embodiment focuses on differences from other embodiments. The same or similar parts in each embodiment can be referred to by each other. For the apparatus disclosed in the embodiments and corresponding to the method disclosed in the embodiments, description of the apparatus is relatively simple, and for the related part, reference may be made to the method part.

The steps of the method or algorithm described in the embodiments disclosed herein may be directly implemented by hardware, a software module executed by a processor or a combination of the two. The software module may be placed in a random-access memory (RAM), an internal memory, a read-only memory (ROM), an electrically programmable ROM, an electrically erasable programmable ROM, a register, a hard disk, a removable disk, a compact disk ROM (CD-ROM) or any other form of storage medium known in the technical field.

What is claimed is:

1. A method for switching between a day mode and a night mode, comprising:
   in response to a current camera mode being the night mode, determining a color temperature value of a current imaging picture;
   determining visible light illuminance of the current imaging picture by utilizing the color temperature value and an infrared light contribution ratio of picture brightness obtained based on white balance statistical information of the current imaging picture, and using the visible light illuminance of the current imaging picture as first visible light illuminance; and
   determining whether to switch from the current night mode to the day mode by utilizing a magnitude relationship between the first visible light illuminance and a first preset illuminance threshold;
   wherein before determining the color temperature value of the current imaging picture in response to the current camera mode being the night mode, the method further comprises:
   determining whether entering of the current night mode is due to switchback after false switching;
   in response to determining that entering of the current night mode is not due to the switchback after false switching, directly initiating the step of determining the color temperature value of the current imaging picture; or
   in response to determining that entering of the current night mode is due to the switchback after false switching, determining real-time change information related to the current night mode, and determining whether the real-time change information satisfies a preset condition; and
   initiating the step of determining the color temperature value of the current imaging picture based on a determination result that the real-time change information satisfies the preset condition.

2. The method according to claim 1, wherein determining the visible light illuminance of the current imaging picture by utilizing the color temperature value and the infrared light contribution ratio of the picture brightness obtained based on the white balance statistical information of the current imaging picture comprises:
   acquiring a first correction factor corresponding to the color temperature value;
   correcting the infrared light contribution ratio by utilizing the first correction factor to obtain a corrected infrared light contribution ratio; and
   determining the visible light illuminance of the current imaging picture by utilizing the corrected infrared light contribution ratio and total ambient light illuminance obtained based on current exposure statistical information.

3. The method according to claim 1, wherein determining the visible light illuminance of the current imaging picture by utilizing the color temperature value and the infrared light contribution ratio of the picture brightness obtained based on the white balance statistical information of the current imaging picture comprises:
   acquiring a second correction factor corresponding to the color temperature value;
   correcting, by utilizing the second correction factor to obtain a corrected visible light contribution ratio, a visible light contribution ratio of the picture brightness obtained based on the infrared light contribution ratio; and
   determining the visible light illuminance of the current imaging picture by utilizing the corrected visible light contribution ratio and total ambient light illuminance obtained based on current exposure statistical information.

4. The method according to claim 1, wherein determining the visible light illuminance of the current imaging picture by utilizing the color temperature value and the infrared light contribution ratio of the picture brightness obtained based on the white balance statistical information of the current imaging picture comprises:
   acquiring a third correction factor corresponding to the color temperature value;
   correcting infrared light illuminance by utilizing the third correction factor to obtain corrected infrared light illuminance; wherein the infrared light illuminance is obtained by utilizing the infrared light contribution ratio and total ambient light illuminance, and the total ambient light illuminance is obtained based on current exposure statistical information; and
   determining the visible light illuminance of the current imaging picture by utilizing the total ambient light illuminance and the corrected infrared light illuminance.

5. The method according to claim 1, wherein determining the visible light illuminance of the current imaging picture by utilizing the color temperature value and the infrared light contribution ratio of the picture brightness obtained based on the white balance statistical information of the current imaging picture comprises:
   acquiring a fourth correction factor corresponding to the color temperature value; and
   correcting, by utilizing the fourth correction factor, the visible light illuminance obtained based on a visible light contribution ratio and total ambient light illuminance to obtain the first visible light illuminance; wherein the visible light contribution ratio is obtained by utilizing the infrared light contribution ratio, and the total ambient light illuminance is obtained based on current exposure statistical information.

6. The method according to claim 1, wherein determining the real-time change information related to the current night mode, and determining whether the real- time change information satisfies the preset condition comprise:
   determining a real-time duration of the current night mode, and determining whether the real-time duration reaches a preset duration threshold; and in response to determining that the real-time duration reaches the preset duration threshold, determining that the real-time change information satisfies the preset condition.

7. The method according to claim 1, wherein determining the real-time change information related to the current night mode, and determining whether the real- time change information satisfies the preset condition comprise:
   determining a real-time accumulated change of imaging pictures of the current night mode, and determining whether the real-time accumulated change is greater than a preset change threshold; and in response to determining that the real-time duration accumulated change is greater than the preset change threshold, determining that the real-time change information satisfies the preset condition.

8. The method according to claim 1, further comprising:
in response to the current camera mode being the day mode, determining total ambient light illuminance obtained based on current exposure statistical information as the visible light illuminance of the current imaging picture to obtain second visible light illuminance, and determining whether to switch from the current day mode to the night mode by utilizing a magnitude relationship between the second visible light illuminance and a second preset illuminance threshold.

9. The method according to claim 8, wherein before in response to the current camera mode being the day mode, determining the total ambient light illuminance obtained based on the current exposure statistical information as the visible light illuminance of the current imaging picture to obtain the second visible light illuminance, the method further comprises:
determining whether entering of the current day mode is due to false switching; and
in response to determining that entering of the current day mode is not due to the false switching, directly initiating the step of determining the total ambient light illuminance obtained based on the current exposure statistical information as the visible light illuminance of the current imaging picture to obtain the second visible light illuminance;
in response to determining that entering of the current day mode is due to the false switching, performing mode switchback to enter the night mode.

10. The method according to claim 9, wherein determining whether entering of the current day mode is due to the false switching comprises:
determining the total ambient light illuminance obtained based on the current exposure statistical information as the visible light illuminance of the current imaging picture to obtain third visible light illuminance, and determining whether the third visible light illuminance is less than the second preset illuminance threshold; and
in response to determining that the third visible light illuminance is less than the second preset illuminance threshold, determining that entering of the current day mode is due to the false switching;
in response to determining that the third visible light illuminance is not less than the second preset illuminance threshold, determining that entering of the current day mode is due to normal switching.

11. The method according to claim 1, wherein in response to the current camera mode being the night mode, determining the color temperature value of the current imaging picture comprises:
determining an R/G value of the current imaging picture as a first R/G value, and determining a B/G value of the current imaging picture as a first B/G value;
acquiring an R/G value of an imaging picture under full infrared light as a second R/G value, and acquiring a B/G value of the imaging picture under the full infrared light as a second B/G value;
determining a first slope by utilizing the first R/G value, the first B/G value, the second R/G value and the second B/G value; and determining, based on a preset mapping relationship between slopes and color temperature values, a color temperature value corresponding to the first slope as the color temperature value of the current imaging picture;
wherein the first slope satisfies that:

$$\tan\theta_1 = \frac{B_2/G_2 - B_1/G_1}{R_2/G_2 - R_1/G_1};$$

where $\tan\theta_1$ represents the first slope, $B_1/G_1$ represents the first B/G value, $R_1/G_1$ represents the first R/G value, $B_2/G_2$ represents the second B/G value, and $R_2/G_2$ represents the second R/G value.

12. The method according to claim 1, wherein in response to the current camera mode being the night mode, determining the color temperature value of the current imaging picture comprises:
determining an R/G value of an imaging picture corresponding to a first infrared light strength in the current night mode as a third R/G value, and determining a B/G value of the imaging picture corresponding to the first infrared light strength in the current night mode as a third B/G value;
determining an R/G value of an imaging picture corresponding to a second infrared light strength in the current night mode as a fourth R/G value, and determining a B/G value of the imaging picture corresponding to the second infrared light strength in the current night mode as a fourth B/G value;
determining a second slope by utilizing the third R/G value, the third B/G value, the fourth R/G value and the fourth B/G value; and
determining, based on a preset mapping relationship between slopes and color temperature values, a color temperature value corresponding to the second slope as the color temperature value of the current imaging picture;
wherein the second slope satisfies that:

$$\tan\theta_2 = \frac{B_4/G_4 - B_3/G_3}{R_4/G_4 - R_3/G_3};$$

where $\tan\theta_2$ represents the second slope, $B_3/G_3$ represents the third B/G value, $R_3/G_3$ represents the third R/G value, $B_4/G_4$ represents the fourth B/G value, and $R_4/G_4$ represents the fourth R/G value.

13. A device for switching between a day mode and a night mode, comprising:
a memory, which is configured to store a computer program; and
a processor, which is configured to execute the computer program to implement:
in response to a current camera mode being the night mode, determining a color temperature value of a current imaging picture;
determining visible light illuminance of the current imaging picture by utilizing the color temperature value and an infrared light contribution ratio of picture brightness obtained based on white balance statistical information of the current imaging picture, and using the visible light illuminance of the current imaging picture as first visible light illuminance; and
determining whether to switch from the current night mode to the day mode by utilizing a magnitude relationship between the first visible light illuminance and a first preset illuminance threshold;

wherein before determining the color temperature value of the current imaging picture in response to the current camera mode being the night mode, the processor is configured to execute the computer program to further implement:

determining whether entering of the current night mode is due to switchback after false switching;

in response to determining that entering of the current night mode is not due to the switchback after false switching, directly initiating the step of determining the color temperature value of the current imaging picture; or in response to determining that entering of the current night mode is due to the switchback after false switching, determining real-time change information related to the current night mode, and determining whether the real-time change information satisfies a preset condition; and initiating the step of determining the color temperature value of the current imaging picture based on a determination result that the real-time change information satisfies the preset condition.

14. A camera, comprising:

the device for switching between a day mode and a night mode according to claim 13;

an image sensor, which is configured to collect images;

an infrared lamp, which is configured to project infrared light to a surrounding environment; and an infrared cut-off filter, which is configured to: filter infrared light to prevent the infrared light from entering the image sensor in a turned-on state, and allow the infrared light to pass through and enter the image sensor in a turned-off state.

15. A non-transitory computer-readable storage medium, configured to store a computer program, wherein the computer program, when executed by a processor, implements the following:

in response to a current camera mode being the night mode, determining a color temperature value of a current imaging picture;

determining visible light illuminance of the current imaging picture by utilizing the color temperature value and an infrared light contribution ratio of picture brightness obtained based on white balance statistical information of the current imaging picture, and using the visible light illuminance of the current imaging picture as first visible light illuminance; and determining whether to switch from the current night mode to the day mode by utilizing a magnitude relationship between the first visible light illuminance and a first preset illuminance threshold;

wherein before determining the color temperature value of the current imaging picture in response to the current camera mode being the night mode, when executed by the processor, the computer program further implements:

determining whether entering of the current night mode is due to switchback after false switching;

in response to determining that entering of the current night mode is not due to the switchback after false switching, directly initiating the step of determining the color temperature value of the current imaging picture; or in response to determining that entering of the current night mode is due to the switchback after false switching, determining real-time change information related to the current night mode, and determining whether the real-time change information satisfies a preset condition; and initiating the step of determining the color temperature value of the current imaging picture based on a determination result that the real-time change information satisfies the preset condition.

16. The device according to claim 13, wherein the processor is configured to execute the computer program to implement determining the real-time change information related to the current night mode, and determining whether the real-time change information satisfies the preset condition by:

determining a real-time duration of the current night mode, and determining whether the real-time duration reaches a preset duration threshold; and in response to determining that the real-time duration reaches the preset duration threshold, determining that the real-time change information satisfies the preset condition.

17. The device according to claim 13, wherein the processor is configured to execute the computer program to implement determining the real-time change information related to the current night mode, and determining whether the real-time change information satisfies the preset condition by:

determining a real-time accumulated change of imaging pictures of the current night mode, and determining whether the real-time accumulated change is greater than a preset change threshold; and in response to determining that the real-time duration accumulated change is greater than the preset change threshold, determining that the real-time change information satisfies the preset condition.

18. The device according to claim 13, wherein the processor is configured to execute the computer program to further implement:

in response to the current camera mode being the day mode, determining total ambient light illuminance obtained based on current exposure statistical information as the visible light illuminance of the current imaging picture to obtain second visible light illuminance, and determining whether to switch from the current day mode to the night mode by utilizing a magnitude relationship between the second visible light illuminance and a second preset illuminance threshold.

19. The device according to claim 18, wherein before in response to the current camera mode being the day mode, determining the total ambient light illuminance obtained based on the current exposure statistical information as the visible light illuminance of the current imaging picture to obtain the second visible light illuminance, the processor is configured to execute the computer program to further implement:

determining whether entering of the current day mode is due to false switching; and in response to determining that entering of the current day mode is not due to the false switching, directly initiating the step of determining the total ambient light illuminance obtained based on the current exposure statistical information as the visible light illuminance of the current imaging picture to obtain the second visible light illuminance;

in response to determining that entering of the current day mode is due to the false switching, performing mode switchback to enter the night mode.

20. The device according to claim 19, wherein the processor is configured to execute the computer program to implement determining whether entering of the current day mode is due to the false switching by:

determining the total ambient light illuminance obtained based on the current exposure statistical information as the visible light illuminance of the current imaging picture to obtain third visible light illuminance, and determining whether the third visible light illuminance is less than the second preset illuminance threshold; and in response to determining that the third visible light illuminance is less than the second preset illuminance threshold, determining that entering of the current day mode is due to the false switching;

in response to determining that the third visible light illuminance is not less than the second preset illuminance threshold, determining that entering of the current day mode is due to normal switching.

\* \* \* \* \*